United States Patent
Foo

(10) Patent No.: US 10,158,173 B2
(45) Date of Patent: Dec. 18, 2018

(54) ORTHOGONAL-BEAM-SPACE SPATIAL MULTIPLEXING RADIO COMMUNICATION SYSTEM AND ASSOCIATED ANTENNA ARRAY

(71) Applicant: Senglee Foo, Ottawa (CA)

(72) Inventor: Senglee Foo, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 516 days.

(21) Appl. No.: 14/725,306

(22) Filed: May 29, 2015

(65) Prior Publication Data

US 2016/0352012 A1    Dec. 1, 2016

(51) Int. Cl.
| | |
|---|---|
| H01Q 1/40 | (2006.01) |
| H04B 7/06 | (2006.01) |
| H01Q 3/40 | (2006.01) |
| H01Q 21/06 | (2006.01) |
| H04B 7/0452 | (2017.01) |
| H04B 7/0426 | (2017.01) |

(52) U.S. Cl.
CPC ............ H01Q 3/40 (2013.01); H01Q 21/065 (2013.01); H04B 7/0452 (2013.01); H04B 7/0426 (2013.01)

(58) Field of Classification Search
CPC ...... H01Q 21/065; H01Q 3/40; H04B 7/0617; H04B 7/0456
See application file for complete search history.

(56) References Cited

U.S. PATENT DOCUMENTS

| | | |
|---|---|---|
| 2003/0200398 A1 | 10/2003 | Harris |
| 2009/0279486 A1 | 11/2009 | Kishigami et al. |

(Continued)

FOREIGN PATENT DOCUMENTS

| | | |
|---|---|---|
| CN | 103458036 A | 12/2013 |
| CN | 104063355 A | 9/2014 |
| WO | 2006088984 A2 | 8/2006 |

OTHER PUBLICATIONS

Foo, S., "On Higher-Order-Sectorization Cellular Arrays," S. IEEE Antennas and Propagation Society International Symposium, Jul. 2014, pp. 111-112.

(Continued)

*Primary Examiner* — Ross Varndell

(57) ABSTRACT

Methods and systems for Spatial Multiplexing Mu-MIMO radio communications are provided. An antenna array is controlled to establish plural radio beams which are mutually orthogonal in terms of excitation functions and which are differently spatially directed to cover a geographic area. The beams may be arranged in angular space in a pattern of rows, with adjacent rows being offset. To facilitate same, the antenna array may include elements which are offset from neighboring elements horizontally, vertically, or both. For each terminal, a subset of the radio beams may be selected for communication. The selection may prefer higher-power beams, where power is determined by summing contributions from eigen-channels. Subsets of radio beams may be grouped into orthogonal channels for use in servicing different sets of terminals in different geographic areas, and terminals sharing a channel may further share resources using multi-access techniques.

35 Claims, 10 Drawing Sheets

(56) References Cited

U.S. PATENT DOCUMENTS

| | | | | |
|---|---|---|---|---|
| 2014/0029599 A1* | 1/2014 | Kinamon | ............. | H04B 7/0857 |
| | | | | 370/338 |
| 2014/0162655 A1* | 6/2014 | Hong | ................... | H01Q 21/061 |
| | | | | 455/436 |
| 2015/0215013 A1* | 7/2015 | Strong | ................ | H04B 7/0452 |
| | | | | 370/336 |
| 2015/0341098 A1* | 11/2015 | Angeletti | ................ | H01Q 3/40 |
| | | | | 375/267 |
| 2016/0043897 A1 | 2/2016 | Xing | | |

OTHER PUBLICATIONS

Foo, S., "Orthogonal-Beam-Space Massive-MIMO Array" Abstract submitted for IEEE APWC 2015.
Stein, S. "On Cross Coupling in Multiple-Beam Antennas," IRE Trans. on Antennas and Prog., Sep. 1962, vol. 10, Issue 5, pp. 548-558.
English translation of Abstract for CN103458036A.
International Search Report dated Sep. 8, 2016 for corresponding International Application No. PCT/CN2015/097267 filed Dec. 14, 2015.

* cited by examiner

32-BEAM ORTHOGONAL-BEAM-SPACE

TYPICAL 8-BEAMS ORTHOGONAL-BEAM-SPACE CHANNELS

TYPICAL 40-BEAMS ORTHOGONAL-BEAM-SPACE CHANNELS

ORTHOGONAL-BEAM-SPACE SPATIAL MULTIPLEXING RADIO COMMUNICATION SYSTEM AND ASSOCIATED ANTENNA ARRAY

FIELD OF THE INVENTION

The present invention pertains to the field of radio communications and in particular to spatial multiplexing in Multi-user, Multi-Input Multi-Output (Mu-MIMO) radio communication systems.

BACKGROUND

Multi-user, Multi-Input Multi-Output (Mu-MIMO) radio communication systems, many of which have historically been deployed in cellular communication systems, have been proposed in which a base station MIMO antenna is used to communicate, for example in the downlink direction, with several separate radio terminals, such as mobile devices, typically terminal devices such as User Equipment (UE) nodes. Massive MIMO systems have also been proposed in which radio access points, such as but not limited to cellular base stations, are equipped with a large number of antennas, for example in which the number of antennas at the radio access point is greater than the number of terminals that are communicatively coupled to the radio access point.

In a conventional multi-access wireless communications network, communications between a user terminal and a base station within a sector is performed by orthogonalizing the channel using schemes such as orthogonal coding, frequency separation, and/or time separation. Because there are a limited number of orthogonal resources available, this approach is inherently limited with respect to the overall number of UEs, that can be served within a sector.

Existing communication schemes incorporating massive MIMO typically rely on use of interference cancellation precoding schemes such as Zero-Forcing (ZF) and Minimum Mean Square Error (MMSE) algorithms. These approaches to massive MIMO attempt to suppress multi-user interference (MUI) through interference cancelation. However, these methods are limited to serving UEs that have relatively long coherence times and low channel correlations. Furthermore, these methods produce transmit beams which can vary significantly depending upon the geographic distribution of terminals and therefore do not guarantee port orthogonality between channels, for example such that the coupling or cross-talk between ports of different channels cannot be reliably maintained near zero. This can lead to significant loss of capacity due to loss in system performance as a result of channel coupling.

Therefore there is a need for a method and system for Spatial Multiplexing Mu-MIMO radio communications, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and system for Spatial Multiplexing Mu-MIMO radio communications, such as downlink communication. In accordance with embodiments of the present invention, there is provided a method for radio communication between an access point and a set of terminals located in a predetermined geographic region served by the access point, the method comprising: controlling an array of antenna elements, associated with the access point, to establish a plurality of mutually orthogonal radio beams, each of the established plurality of radio beams corresponding to a respective one of a plurality of radiation patterns, each of the plurality of radiation patterns differing spatially from the other radiation patterns in the plurality; and selecting a subset of the plurality of radio beams for use in transmitting a signal to one of the set of terminals. In various embodiments the mutually orthogonal radio beams also have a low Beam Coupling Factor.

In accordance with embodiments of the present invention, there is provided a wireless communication system for radio communication between an access point and a set of terminals located in a predetermined geographic region served by the access point, the wireless communication system comprising: an array of antenna elements associated with the access point; a beam controller configured to control the array of antenna elements to establish a plurality of mutually orthogonal radio beams, each of the plurality corresponding to a one of a plurality of radiation patterns differing spatially from the other radiation patterns in the plurality; and a beam selector configured to select a subset of the plurality of radio beams for use in transmitting a signal to one of the set of terminals. In various embodiments the mutually orthogonal radio beams also have a low Beam Coupling Factor.

In accordance with embodiments of the present invention, there is provided a radio communication access point for serving a set of terminals located in a predetermined geographic region, the access point comprising: an array of antenna elements; a beam controller configured to control the array of antenna elements to establish a plurality of mutually orthogonal radio beams, each of the established plurality of radio beams corresponding to one of a plurality of radiation patterns, each of the plurality of radiation patterns differing spatially from the other radiation patterns in the plurality; and a beam selector configured to select a subset of the plurality of radio beams for use in transmitting a signal to one of the set of terminals.

In accordance with embodiments of the present invention, there is provided an antenna array comprising: a first set of antenna elements arranged in a first regular grid pattern extending in two directions; a second set of antenna elements arranged in a second regular grid extending in said two directions, wherein the second regular grid pattern is interleaved with the first regular grid pattern and is diagonally offset from the first regular grid pattern with respect to said two directions. Further sets of similarly interleaved and mutually diagonally offset antenna elements may also be provided.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
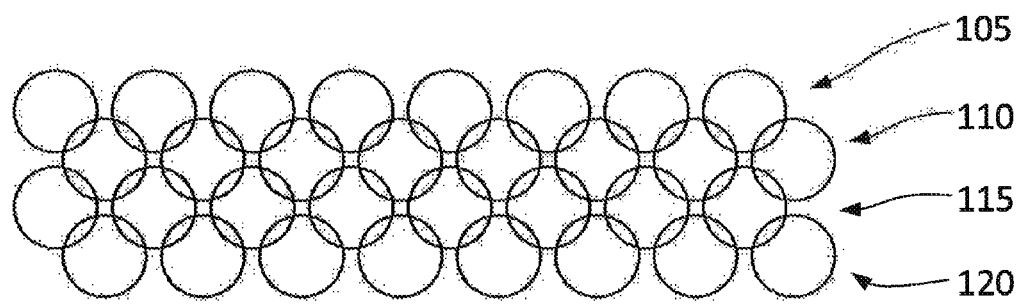
FIG. 1 illustrates a spatial arrangement of radio beams in accordance with embodiments of the present invention.

As used herein, the term "about" should be read as including variation from the nominal value, for example, a +/−10% variation from the nominal value. It is to be understood that such a variation is always included in a given value provided herein, whether or not it is specifically referred to.

An aspect of the present invention relates to a method for radio communication between an access point and a set of terminals located in a predetermined geographic region served by the access point. The term "communication" may refer to unidirectional communication, such as downlink communication, or alternatively to bidirectional communication. The method includes controlling an array of antenna elements associated with the access point to establish a plurality of radio beams. Each of the radio beams corresponds respectively to one of a plurality of radiation patterns. The array may be a massive MIMO array, for example. The plurality of radiation patterns differ spatially from one another, for example to partition the predetermined geographic region. In various embodiments, each of the radio beams can thus be directed toward a different coordinate region in azimuth/elevation space, hence extending from the antenna array toward a different part of the geographic region. Further, the plurality of radio beams are substantially mutually orthogonal in a sense to be described below, and may also have a low Beam Coupling Factor. The method further includes, for at least one of the set of terminals, selecting a subset of less than all of the plurality of radio beams for use in communication between said one of the set of terminals and the access point. The communication may correspond to transmitting signals from the access point to at least one of the set of terminals. In some embodiments the communication may correspond to receiving signals at the access point from at least one of the set of terminals. In the case of reception, signals received from plural elements of the array may be adjusted in amplitude and phase and then combined in order to establish the plurality of radio beams as information-carrying entities within the access point operating as a receiver, in accordance with receiver beamforming techniques.

Radio beam selection may comprise selecting a relatively small number of beams for use in communication with each terminal. For example, the number of beams may be two beams or three beams. In various embodiments, a power criterion, as described below, is used to drive the beam selection, such that beams of relatively low power with respect to a terminal are unused for communication with said terminal. Beam power in this sense may relate to the eigen-decomposition of a system matrix which is generated from the MIMO channel matrix for a given terminal. For example, beam power may refer to a weighted sum of components of the eigenvectors of the system matrix, as specified in Equation (2) herein.

In various embodiments, orthogonality between two beams A and B may correspond to the following condition:

$$\frac{\sum_i W_i^A \cdot W_i^{B*}}{\sum_i \|W_i^A \cdot W_i^{B*}\|} < \varepsilon, \quad (1)$$

where the summation index i is from 1 to the number of elements N of the antenna array, $W_i^A$ and $W_i^B$ are the complex-valued excitations of the ith radiating element of the antenna array for production of beam A and beam B, respectively, and ε is a predetermined threshold value which is substantially close to or equal to zero. It is noted that a beam characteristic is typically determined by excitation functions which indicate delivered power amplitudes and phases of each of the antenna array radiating elements, for example according to existing beamforming techniques. As such, orthogonality between two beams can be achieved when the excitation vectors $W^A$ and $W^{B*}$ (having components $W_i^A$ and $W_i^{B*}$, where * denotes complex conjugate) of the two beams are substantially orthogonal, that is their dot product is near zero. More specifically, the dot product may be below a threshold value ε, where orthogonality increases as ε decreases toward zero. The threshold value ε may be selected based on requirements and capabilities in a particular system implementation. In some embodiments, ε may be below about −15 dB. In some embodiments, ε may be about −17 dB. In some embodiments, ε may be below about −20 dB. Mutual orthogonality among a set of beams is similarly achieved when this condition holds pairwise for all beams of the set. In various embodiments, beam orthogonality is provided for in the sense of standard MIMO systems, array feed networks such as Butler matrices, and the like.

Another aspect of the present invention relates to a wireless communication system for radio communication between an access point (base station) and a set of terminals located in a predetermined geographic region served by the access point. The wireless communication system includes an array of antenna elements associated with the access point. In various embodiments, the wireless communication system may further include functional components of one or both of the access point and the set of terminals. The wireless communication system further includes a beam controller configured to control the array of antenna elements to establish a plurality of radio beams corresponding respectively to a plurality of radiation patterns, the radiation patterns differing spatially from one another. For example the radiation patterns may partition the predetermined geographic region, or at least a substantial or major portion of the geographic region. In addition, the radio beams are mutually orthogonal and may have a low Beam Coupling Factor. The system further includes a beam selector which is configured, for at least one of the set of terminals, to select a subset of the plurality of radio beams for use in communication between said one of the set of terminals and the access point. The communication may correspond to transmitting a signal from the access point to at least one of the set of terminals or receiving a signal at the access point from one of the set of terminals. One skilled in the art will appreciate that in some embodiments, adjacent partitions may overlap, and conversely there may be portions of a coverage area that are not covered by a partition.

As such, embodiments of the present invention relate to the sub-sectorization of a geographic area by defining a plurality of orthogonal beams using beamforming control of an antenna array belonging to an access point. The beams, or groups of beams, are then used for communication, such as downlink communication, with various terminals served by the access point. For example, beams may be grouped into non-overlapping orthogonal channels, wherein each orthogonal channel is associated with one of the sub-sectors. A sub-sector may correspond for example to a particular angular region of a selected set of beams, less than the total number of beams. This selected set of beams may correspond to an orthogonal channel which is assigned for servicing particular user terminals, for example located within a particular angular space. It should be understood that in referring to a node as a terminal, it is intended for the term to be used in the context of the node being at the terminating end of a point to point transmission. The terminal need not be the final node in a larger communication chain. The terminal could be a mobile device such as a UE, a fixed device using the mobile network such as a machine to machine device, or a fixed device that is a part of the network infrastructure such as a repeater.

In various embodiments of the present invention, each radio beam is associated with a power level that corresponds to a relative or absolute amount of power contribution, from that radio beam, toward communication between a given terminal and the access point under a hypothetical allocation involving all of the plurality of radio beams. Viewed another way, the radio beam power level corresponds to an amount of power contribution from that radio beam, relative to a total amount of power from all beams, which passes between the given terminal and the antenna array in accordance with the MIMO system. Communication in this sense may comprise transmission in the downlink direction, or alternatively transmission in the uplink direction, or a combination thereof. The power level may be determined in accordance with an eigen-decomposition of a system matrix for a given terminal, the system matrix equal to $H_k H_k^H$, wherein $H_k$ is the MIMO channel matrix for the given terminal k. Selecting a subset of the plurality of radio beams may include selecting, for membership in the subset, radio beams having higher ones of said power levels relative to one or both of: a predetermined threshold power level; and the relative power levels of the plurality of radio beams.

In some embodiments, the array may be configured to limit overlap between subsets of the plurality of radio beams allocated to different members of the set of terminals. For example, as much as possible, different channels used for communication with different terminals may be formed from disjoint sets of radio beams.

Various embodiments of the present invention provide for a higher-order sectorization that produces multiple flexible sub-regions (such as sub-sectors) within a given geographic region, such as a cellular sector, served by a wireless communication system. The sub-regions may be matched to the propagation environment and user profiles and/or distribution of terminals within the geographic region. This may facilitate providing a radio communication service which is adaptive and flexible to various distributions of geographical user population density.

Various embodiments of the present invention provide for a radio communication system comprising an antenna array such as a Multi-user MIMO (Mu-MIMO) or Massive MIMO array. In such embodiments, multiple orthogonal channels of flexible sizes may be formed within a geographic region, such as a cellular sector, using multiple orthogonal beams making up an orthogonal-beam space which substantially spans the geographic region. Accordingly, an access point such as a base station may be configured to adapt its limited resources to match the propagation environment and user geography. This may potentially facilitate operation of the system in a power-efficient and spectral-efficient manner, relative to existing solutions. In some embodiments, beams and/or channels may be adjusted, beam power may be adjusted, or the like.

In various embodiments, the antenna array operates on the basis of orthogonal-beam space, in which a portion of the angular space surrounding the antenna array is sub-divided into multiple, potentially relatively high-gain and focused, beams that are substantially orthogonal to each other. An example of such a sub-division is illustrated in FIG. 1, in which a plurality of rows 105, 110, 115, 120 of beams are arranged in the azimuthal direction, and in which the rows 105, 110, 115, 120 are stacked adjacently in the elevation direction. Further, adjacent rows are offset in the azimuthal direction, for example such that the center of a given beam in a given row is substantially aligned, in the elevation direction, with the midpoint of a line segment connecting the immediately adjacent beams located within a row above or below the given row. This may increase the spatial separation between centers of beams. It is noted that some beam overlap is shown in the idealized arrangement of FIG. 1. Additionally, some regions do not fall within the idealized beam boundaries, but may nonetheless be served by the beams, for example served by overlapped beams. In some embodiments the angular space may substantially map to the complete angular space of a cellular sector or other geographic region. The offset configuration of FIG. 1 may assist in reducing beam overlap and/or beam coupling factor.

In embodiments of the present invention, a terminal may be configured to communicate with the access point through several of the above-mentioned orthogonal beams concurrently, for example to take advantage of multipath propagations from the environment. However, in various embodiments, a limited number of the propagation paths (beams) are selected for use by a terminal, while other beams are unused by that terminal. In a downlink scenario, where the access point is transmitting to a plurality of terminals, the selection of which beams are to be used and which beams are to be unused may be based on a predetermined criterion, such as a percentage of total power criterion. In uplink scenarios, where a plurality of terminals are transmitting to the access point, a different selection process can be used based on different criteria. Signals from each antenna in a receive array can be weighted and/or phase shifted in accordance with the criteria to achieve objectives such as beam selection based on the percentage of total power criterion referred to above. Such a criterion may be configured for example as described herein. For example, some criteria as described herein may facilitate approaching or substantially achieving optimum capacity and minimum interference among terminals.

In various embodiments, by separating terminals into proper orthogonal beam spaces, the access point may be configured to transmit to multiple terminals substantially simultaneously and independently, and without transmissions to one terminal causing unwanted signal interference with respect to another terminal. The orthogonality relationship of Equation (1) may hold true for all channels as long as no beam is shared among any channels. That is, two channels may be orthogonal when they are formed from disjoint sets of orthogonal beams.

In various embodiments, downlink transmission to different terminals assigned to the same orthogonal beam spaces may still be orthogonalized through the allocation of different time, frequency and/or code resources. For example, transmissions toward two terminals assigned to the same orthogonal beam space may be configured to share the channel through use of code-division, time-division, or frequency-division multiplexing and/or multiple access techniques, or a combination thereof, or the like, as would be readily understood by a worker skilled in the art. In some embodiments, uplink transmissions from different terminals may be similarly orthogonalized. Additionally, time, frequency and/or code resources may be re-used in the other orthogonal beam spaces because of the beam orthogonality. As such, resources may be spatially re-used across different orthogonal channels or sub-sectors, analogously to conventional spatial re-use of radio resources.

In some embodiments, as a result of re-use of resources in multiple orthogonal beam spaces within a geographic region, an access point may potentially be capable of handling more terminals with limited signal interference, relative to current communication regimes. In effect, overall spectral efficiency may be increased. Furthermore, power efficiency may be relatively high, for example due to the use of narrow orthogonal beams with high directivity.

Embodiments of the present invention provide for an Orthogonal-Beam-Space Multi-user MIMO (Mu-MIMO) array. This type of array transmits and receives signals through orthogonal-beam spaces. In orthogonal-beam spaces, a portion of the angular space surrounding the antenna array, which may correspond for example to the complete angular space of a cellular sector, is dissolved into multiple relatively narrow beams that are orthogonal to each other. Beams may be relatively narrow in one or both of the elevation and azimuthal directions, for example. For example, beam main lobes may span between 1 and 10 degrees of angular space. Embodiments of the present invention may further comprise operating each of these beams independently from one another, or operating different sets of beams corresponding to different orthogonal channels independently from one another. Because the beams are mutually orthogonal, independent operation may be executed with a limited amount of interference between orthogonal beams and/or orthogonal channels.

Embodiments of the present invention provide for a massive-MIMO architecture for producing a set of well-defined, high-gain, orthogonal beams with relatively low beam coupling factors. The orthogonal beams are configured to cover a major portion or substantially the entire 2D angular space of the intended communications space. Because each beam is orthogonal with low beam coupling with other beams, these transmit beams may be considered inherently independent and relatively uncorrelated. Use of the well-defined orthogonal beams as basis for user links may therefore, in some embodiments, facilitate beam orthogonality, low interference among terminals, and acceptable beam patterns in all terminal distribution scenarios.

Embodiments of the present invention provide an adaptive higher-order Mu-MIMO communication regime in which channels are spatially multiplexed. Channels may be adaptively defined, for example, with flexible sizes or orthogonal channels. Channel size may correspond at least in part to the number of orthogonal beams used to form a channel. Adaptation may be with respect to the observed radio propagation environment, geographic distribution of terminals, or the like.

Embodiments of the present invention include monitoring beam power distributions with respect to various system users (terminals). Based on the monitored beam power distributions, channel sizes and beams may be allocated for use by the various terminals. As such, channel sizes and beam allocations may be allocated so as to match the current radio propagation environment and distribution profiles of the users (terminals).

Various embodiments of the present invention comprise defining eigen-beams and eigen-beam patterns for use in servicing terminals. Such eigen-beams may correspond to weighted combinations of beams in the orthogonal beam space. In particular, the weighted combinations are such that each beam is weighted, with respect to beam power, in accordance with weightings derived from a corresponding eigenvector of a system matrix $H_k H_k^H$, the system matrix being derived from the channel matrix $H_k$ for a corresponding user k. In various embodiments, selection of orthogonal channels for use by respective terminals may be performed based on power ratios of eigen-beam patterns.

Various embodiments of the present invention may be used for uplink communication, downlink communication, or both, for example in half-duplex or full-duplex configurations. Due to antenna reciprocity, electrical characteristics of the various system antennas may be equal whether the antennas are transmitting or receiving, as would be readily understood by a worker skilled in the art. As such, while various described embodiments of the invention relate to downlink transmission from the access point to one or more terminals, aspects such as beamforming and beam selection may be adapted to facilitate uplink transmission from terminals to the access point.

Figure 2:
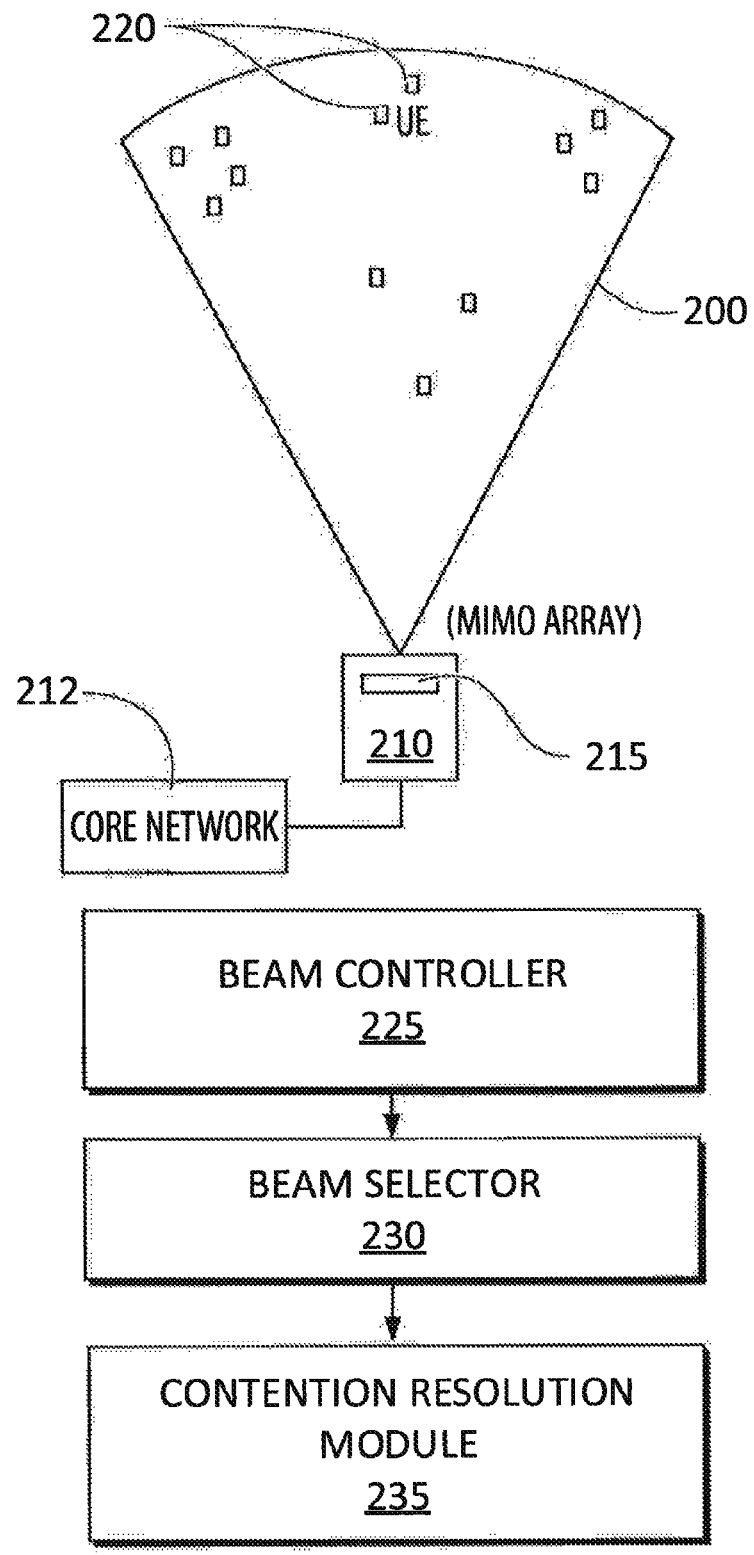
FIG. 2 illustrates a wireless communication system provided in accordance with embodiments of the present invention.

FIG. 2 illustrates a wireless communication system provided in accordance with embodiments of the present invention. The system includes an access point or base station 210 which serves a geographic area 200 of a predetermined size and shape. The access point 210 includes an antenna array 215 for facilitating a Mu-MIMO communication regime. Various terminals 220 within the geographic area 200 are communicatively coupled to the access point 210 through Mu-MIMO radio communication. The system comprises a beam controller 225, a beam selector 230, and in some embodiments further modules such as a contention resolution module 235. In an example embodiment, the beam controller 225, beam selector 230, and contention resolution module 235 may be located primarily within the access point 210, for example as implemented using computer equipment operatively coupled to RF components. However, it is noted that these modules may be distributed within different components of the wireless communication and supporting equipment. For example, some functionality of the modules may be provided by computer and/or RF equipment of the terminals 220. As another example, some functionality of the modules may be provided within computer equipment within a core network 212 coupled to the access point 210.

As such, although the system as a whole provides the functionality of the modules, the precise location and identity of the system components providing such functionality may vary. For example, the access point (base station) may be configured to perform beam selection operations based on channel state information which may be obtained by and transmitted from the terminals to the base station. The access point may include the beam controller 225, beam selector 230 and the contention resolution module 235.

Figure 3A:
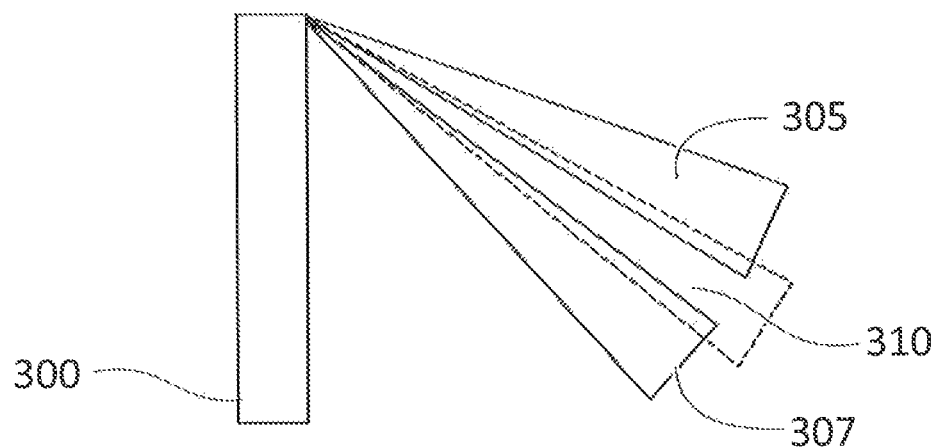
FIGS. 3A and 3B illustrate elevation and plan views of an antenna array and associated beams, provided in accordance with embodiments of the present invention.
Figure 3B:
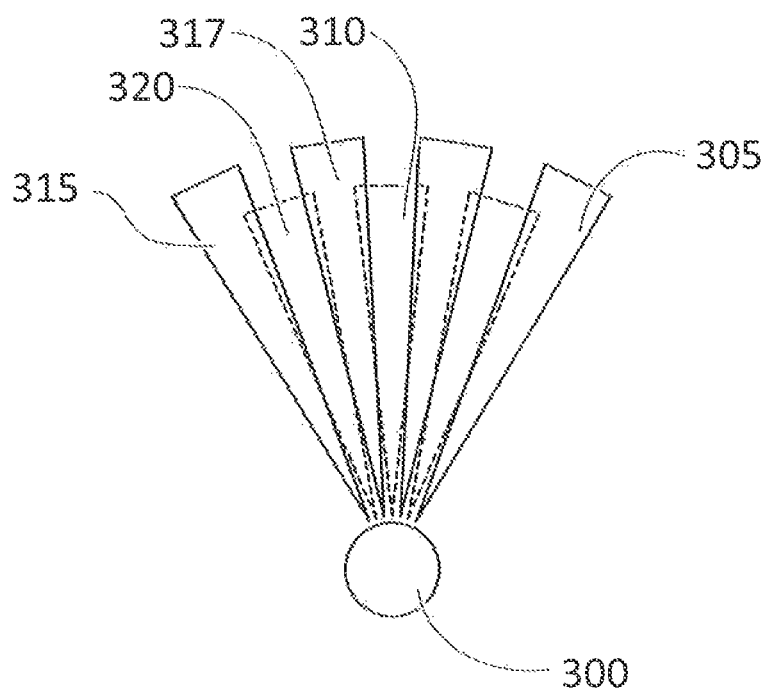

FIGS. 3A and 3B illustrate elevation and plan views, respectively, of an antenna array 300 configured to communicate with terminals in a geographic region via a plurality of beams, such as illustrated beams 305, 307, 310, 315, 317, 320. Although the beams are illustrated as conical regions, it will be readily appreciated that each beam may correspond to a radiation pattern having a predetermined amount of directivity, main lobes, side lobes, and the like. In various embodiments, the radiation patterns desirably include one main lobe and relatively high directivity. The antenna array 300 may be a massive MIMO or Mu-MIMO array, for example, and increased numbers of array elements in the azimuth and elevation directions may facilitate increased azimuthal and elevational directivity, respectively. As illustrated, different beams are directed in different elevation and azimuthal directions. For example, beam 305 is directed at a higher elevation angle than beams 307 and 310, thereby potentially reaching terminals located at a greater distance from the array 300 in some scenarios. Although beam 310 overlaps in elevation with beams 305 and 307, beam 310 may be oriented in a substantially different azimuthal direction, thereby providing for beam separation. As a further example, beams 315, 317 and 320 are directed at different azimuthal angles. Further, although beam 320 may overlap with one or both of beams 315 and 317, beam 320 may be directed at a different elevation angle than either of beams 315 and 317. As such, a staggering of rows of beams may be achieved.

As such, a spatial region surrounding the antenna array 300, and substantially in-line with the geographic area served by the antenna array 300, may be resolved into a plurality of angular sub-regions. Each angular sub-region corresponds to a different angular range in both the elevation and azimuthal directions. Further, edge portions of at least some angular sub-regions may overlap with edge portions of neighbouring angular sub-regions. However, in various embodiments it is desired that each angular sub-region includes a central portion that is non-overlapping with neighbouring angular sub-regions. In addition, the beams may be configured so as to limit the amount of edge portion overlap between neighbouring angular sub-regions. Staggering between adjacent rows or arcs of beams may facilitate such limitation of edge portion overlap. By extrapolating the set of line segments extending from the antenna array through an angular sub-region, each angular sub-region may potentially be associated with a geographic sub-region, for example assuming line-of-sight conditions.

In various embodiments, the antenna array 300 may be controlled to provide for the desired pattern of beams by use of various beam forming methodologies as would be readily understood by a worker skilled in the art, for example by exciting various antenna elements in a given antenna array using a particular combination of amplitudes and phases so as to produce the desired resultant beam radiation patterns. An appropriate beamforming sub-module, driven in an appropriate manner, may be used to produce the desired pattern of beams. The beam forming may be adjusted dynamically in view of current channel conditions, for example.

Figure 4:
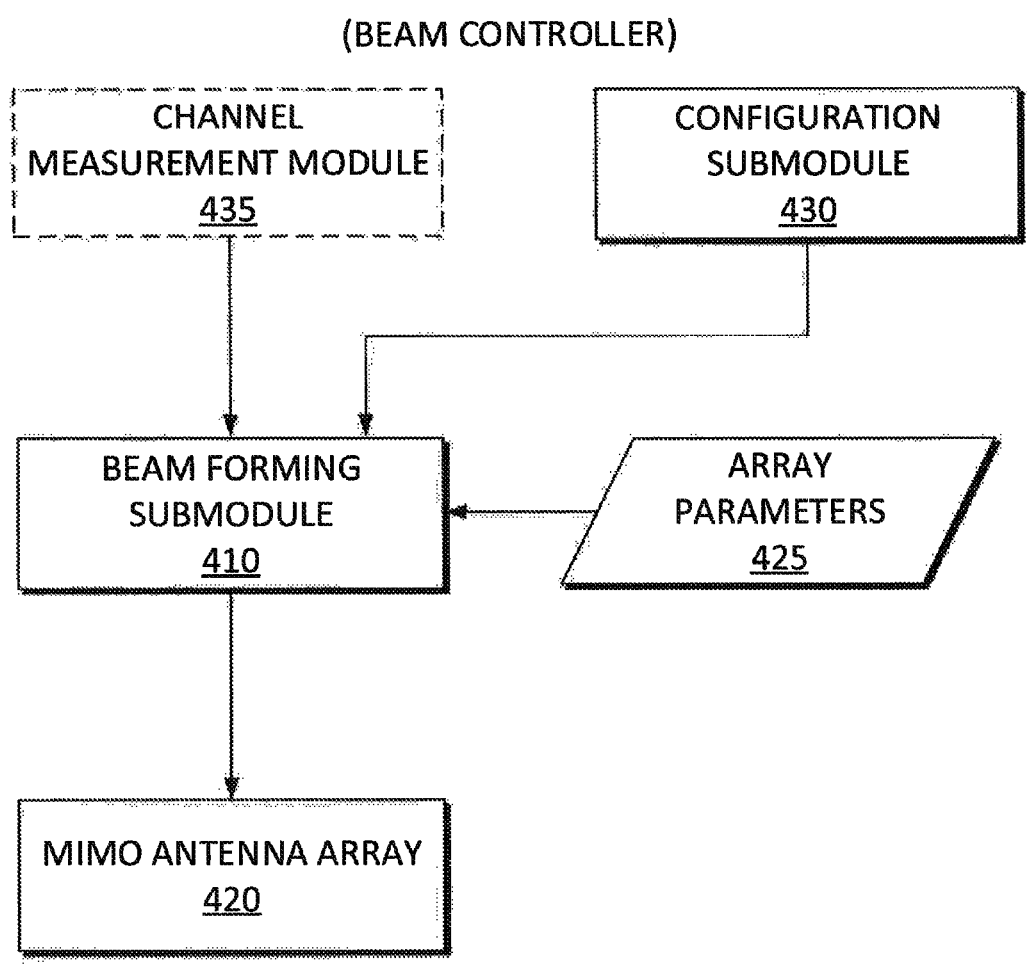
FIG. 4 illustrates a beam controller provided in accordance with embodiments of the present invention.

FIG. 4 illustrates a beam controller provided in accordance with embodiments of the present invention. The beam controller comprises a beamforming sub-module 410 which is configured to control operation of the MIMO antenna array 420 so as to provide the desired spatial pattern of beams. For example for the downlink direction, the beamforming sub-module 410 may control the routing of signals to be transmitted to various elements of the antenna array 420, and additionally may control the phasing and magnitude of various portions of such signals as routed to the various elements of the antenna array 420. To facilitate this operation, the beamforming sub-module may be provided with array parameters 425, such as parameters related to the physical characteristics of the antenna elements. The array parameters may be stored in memory or provided as fixed features of the beam controller. Beamforming in general may be implemented in a variety of ways. A configuration sub-module 430 may provide higher-level parameters for use by the beamforming sub-module, such as amounts of power to allocate to each beam, number of beams, individual or collective beamwidths, restrictions on beam overlap or beam coupling, and the like.

In various embodiments, a channel measurement module 435 which measures and/or receives measurements of current channel conditions, terminal distributions, and the like, may pass channel state information (CSI) to the beamforming sub-module 410 for use. For example, the CSI may correspond to or be used to construct entries of the overall Mu-MIMO channel matrix. As will be readily understood by a worker skilled in the art, for a Mu-MIMO system with p array antenna ports and n terminal ports, the p by n channel matrix $H_{pn}$ is a complex-valued matrix satisfying the equation $y=H_{pn} x+z$, where x is the transmit vector, y is the receive vector, and z is noise. Thus, the entries $h_{ij}$ of the channel matrix reflect the magnitude and phase relationship between elements of the transmit and receive vectors. As a non-limiting example, each terminal may include a single antenna port. The CSI may comprise instantaneous and/or statistical CSI, indicative of signal propagation from between two given ports of the MIMO system. CSI may be received from terminals via wireless communication.

Figure 5:
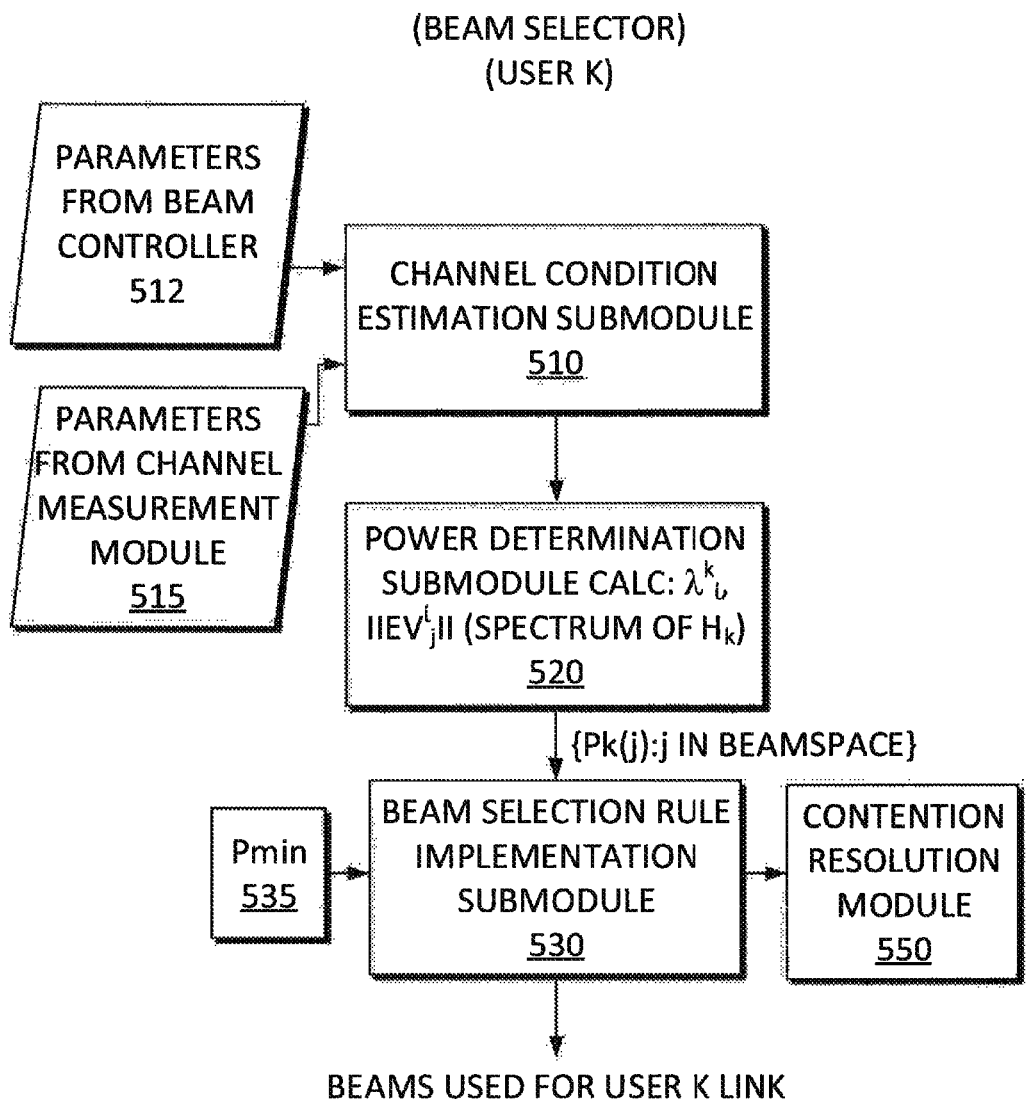
FIG. 5 illustrates a beam selector provided in accordance with embodiments of the present invention.

FIG. 5 illustrates a portion of a beam selector corresponding to a given terminal or user k of the Mu-MIMO system, in accordance with embodiments of the present invention. The overall function of the beam selector is to select, from the set of all beams, a subset of beams to be used for communication between the access point and the terminal k, such as for signal transmission from the access point to the terminal. The functionality of the illustrated portion may be repeated for each terminal k in order to provide the beam selector overall. The operations of the beam selector may be performed in a variety of ways, and that the sequence of operations presented herein is illustrative of one such way.

In some embodiments, a transceiver module may be configured to perform matrix operations in order to transmit data by the antenna array. Such matrix operations may be performed similarly to other precoding operations for Mu-MIMO systems, such as precoding operations that would be readily understood by a worker skilled in the art. Signals containing data for transmission may be routed to various desired array elements with desired amplitude and phase adjustments in order to allocate different signals to the desired beams. For reception, signals received from the various array elements may be similarly combined with amplitude and phase adjustments made in order to reconstruct the signals from various terminals and corresponding to various beams.

The beam selector portion comprises a channel condition estimation sub-module 510 which is configured to estimate CSI with respect to terminal k, for example based on CSI reports received from terminal k. For example, the CSI may correspond to or be used to construct entries of the MIMO channel matrix as it pertains to terminal k, denoted herein $H_k$. In some embodiments, $H_k$ is related to the overall Mu-MIMO channel matrix $H_{mn}$ in that deleting all columns of $H_{mn}$ which pertain to ports of terminals other than terminal k produces $H_k$. The CSI estimates may be made under certain assumptions, such as, in the downlink case, an equal distribution of transmit power to all ports of the antenna array, unity gain receiver antennas of the terminal, and the like. The channel condition estimation sub-module 510 may draw in parameters 512 of the beam controller; parameters 515 provided by the channel measurement module 535, or the like. The parameters 512 and 515 may be stored in memory or provided via signals from other modules.

The beam selector further comprises a power determination sub-module which is configured to determine values indicative of the total power in each beam of the Mu-MIMO array seen by terminal k. For example, the power determination sub-module may be configured to determine values indicative of at least part of the spectrum of the system matrix for terminal k, said system matrix defined by $H_k \cdot H_k^H$, where superscript H denotes the conjugate transpose operation. In this context the spectrum may refer to the spectral decomposition or Eigen decomposition of the system matrix. For example, the eigenvalues $\lambda_i^k$ and magnitudes of the eigenvectors $EV^i$ of the system matrix for terminal k may be determined, where i indexes over all r eigenvalues of said system matrix. Subsequently, the total power in beam j for terminal k, denoted $P^k(j)$, may correspond to the summation over i from 1 to r:

$$P^k(j) = \Sigma_i \lambda_i^k \cdot \|EV^i(j)\|^2 \qquad (2),$$

where $EV^i(j)$ is the jth component of the ith eigenvector $EV^i$.

The beam selector further comprises a beam selection rule implementation module 530 which is configured, based on the values $P^k(j)$ indicative of the total power in each beam of the Mu-MIMO array seen by terminal k, to select, from the set of beams, a subset of beams for use in communicating with terminal k. For example, a limited number of beams of relatively higher power may be selected based on a predetermined rule set. The rule set may include comparison of the beam powers or the sum of beam powers to a threshold parameter Pmin 535 and, for example, selecting a limited or unlimited number of beams having powers greater than the threshold parameter or selecting a substantially minimum number of beams having relatively highest powers such that the selected beams have a sum total power greater than the threshold parameter.

In various embodiments, the system matrix includes at least some substantial off-diagonal components. As such, plural beams may deliver substantial amounts of power to each terminal in a potentially non-trivial manner.

In various embodiments, following beam selection for plural terminals, there may be certain sets of terminals that share one or more beams. As such, the beam selections may be provided to a contention resolution module 550, which is configured to schedule communications between the access point and terminals within each of these sets so as to limit inter-user interference. Such scheduling may comprise multi-access techniques such as frequency division, time division and code division, or the like, or a combination thereof, as would be readily understood by a worker skilled in the art. Notably, frequency, time and/or code resources allocated to a first terminal may be re-allocated to a second terminal, provided that the second terminal is assigned to a different set of beams than the first terminal. This provides for a spatial reuse of resources on the basis of beam usage.

In some embodiments, it is possible that a first terminal may share at least one beam with a second terminal, and the second terminal may share at least one different beam with a third terminal. However, the third terminal may not directly share any beams with the first terminal. In such situations, the contention resolution module may be required to allocate different frequency, time and/or code resources for use by the first and second terminal, and also allocate different frequency, time and/or code resources for use by the second and third terminal, while the first and third terminal may be allowed to use the same frequency, time and/or code resources. As such, in one embodiment, contention resolution may be performed as follows. For each beam, a contention resolution mechanism is defined which allocates resources between all terminals sharing that beam. Further, the contention resolution mechanisms for each beam may operate in parallel and in a potentially coordinated manner.

Technical Treatment

A technical treatment of certain embodiments of the present invention, particularly related to the downlink communication direction, is provided below in order to elucidate same. In the following discussion, the mathematical basis for the operation of the above discussed embodiments will be presented to better aid in the understanding of the operation of the embodiments.

Define a static MIMO channel matrix relating N terminals (also expressed as lowercase n) to a transmit antenna array with p ports by $H_{pn}$ which is a p by n matrix having entries $h_{ij}$.

Let M (also expressed as lowercase m) represent the total number of orthogonal beams to be produced by the transmit array antenna using a beam forming matrix $B_{mp}$. Then the channel matrix can be transformed to beam-space coupling matrix $H_{mn}$ in terms of the beam forming coefficients:

$$H_{mn} = B_{mp} \cdot H_{pn}.$$

Assuming Additive White Gaussian Noise (AWGN), a measure of the channel capacity of the deterministic MIMO channel can be expressed as:

$$C = \log_2 \det[I + (\rho/M) H_{mn} \cdot R_{SS} \cdot H_{mn}^H] \text{ (b/s/Hz)}$$
$$= \sum_i \log_2(1 + (\rho/M)\Lambda_{ii}),$$

where the summation index i is from 1 to r, $\rho = \text{Pave}/N_0$ is the average signal-to-noise ratio, Pave is the power constraint, $\text{Tr}(R_{SS}) = M$, and $\Lambda_{ii}$ is the ith eigenvalue of the eigenvector decomposition (EVD) of the covariance matrix $H_{mn} \cdot R_{SS} \cdot H_{mn}^H$. $R_{SS}$ is a diagonal matrix which represents the power distribution of all beams, and I is the appropriate identity matrix.

Initially, the channel H may be unknown to the transmitter. For the purpose of beam selection for each terminal, embodiments of the present invention may be configured to assume that transmit power is distributed substantially equally among transmit beams. Thus, $R_{SS} = (\text{Pave}/M) I$ is assumed. Consequently, the channel matrix for a single terminal, labelled terminal k, is reduced to:

$$C=\log_2 \det[I+(\rho_0/M)H_k H_k^H],$$

where $H_k$ is the channel matrix for terminal k, the average signal-to-noise ratio, $\rho_0=G_t\rho G_r$, and $G_t$ and $G_r$ represent the directional antenna gains of the transmitter and receiver, respectively. Under the assumption that the receiver antenna gain is unity, i.e. $G_r=1$, then the capacity for terminal k can be expressed as:

$$C=\Sigma_i \log_2(1+G_t\rho/M)\lambda_i^k),$$

where the summation index i is from 1 to r, $\lambda_i^k$ represents the ith eigenvalue of the channel matrix for terminal k, and the channel matrix rank is r. For each terminal k, the total power in beam j, denoted $P^k(j)$ may be expressed, according to embodiments of the present invention, as a sum of contributions from all eigen channels according to Equation (2) as already specified. The resultant function, $P^k(j)$, may be interpreted as the power distribution over the entire beam space, with respect to each terminal k.

Beam Selection

For a potentially large antenna array having a number of elements such that M, the number of produced orthogonal beams, may be significantly greater than the number of terminals N, a significant percentage of the total power may be distributed over a relatively small proportion of the total number of beams. As a non-limiting example, less than five beams may include more than 50 percent of the total power allocated for transmission to a given terminal. To achieve a desired level of performance, embodiments of the present invention are configured to select a limited or possibly minimal number of beams for each terminal link. In various embodiments, beam selection is based on a power criterion. Specifically, beams containing higher levels of total power for terminal k, in the sense of the $P^k(j)$ function, are selected over beams containing lower levels of power for terminal k. The selected number of beams may be limited to less than or equal to a predetermined threshold number of beams, a substantially minimal number of beams resulting in a sum total power exceeding a predetermined threshold power level, or the like, or a combination thereof. The selected beams are then used as part of the link path. According to embodiments, both the effective antenna gains and multiuser interferences (MUI) may be reduced when the number of beams is limited.

In some embodiments, beam selection comprises selecting all beams or a predetermined number of beams which exhibit a total power with respect to terminal k, in the sense of the $P^k(j)$ function, which exceeds a predetermined threshold level Pmin %. When a limited number of beams are selected, the beams with relatively highest power level (but still exceeding the threshold level) may be selected in favour of beams with relatively lower power. Alternatively, another criteria can be used to select from all beams having a total power exceeding the threshold.

In some embodiments, beam selection comprises selecting a limited or even minimal number of beams of the highest power level such that the sum of the total power in the selected beams exceeds a predetermined threshold level Pmin %. For example, the set of beams may be selected for inclusion in a set S of beams for use in the link with terminal k, such that the selection includes a substantially or approximately minimal number of beams satisfying the requirement:

$$\Sigma_j P^k(j) > P\text{min }\%,$$

where the summation is indexed over j belonging to S. The minimal number of beams may be achieved for example by selecting highest-power beams for inclusion in the set S, one at a time, until the sum power requirement is satisfied.

As a result of at least certain simulations carried out, in a typical multipath environment and according to certain embodiments of the present invention, one to three beams may be required for each terminal when the threshold level Pmin % is set between about 45% to about 60%.

In various embodiments, to provide for a desired level of performance, the transmit power for each terminal k and in each selected beam j may be distributed according to the $P^k(j)$ values. For example, the transmit powers may correspond to the $P^k(j)$ values, or to the $P^k(j)$ values scaled by a predetermined constant, or the like.

Multi-User Interference

In embodiments of the present invention, each terminal utilizes a limited number beams that are spatially independent from other terminals. User terminals that require use of overlapping beams may require use of other orthogonal resources for example as provided by time division, frequency division or use of orthogonal codes for channel separation. Because beams are orthogonal, interference between terminals may be adequately characterized through a Beam Coupling Factor (BCF). In particular, the Multi-User Interference (MUI) factor between two terminals (k, l) may be characterized as corresponding to the BCF between active beams of the two terminals:

$$\text{BCF}(k,l)=\Sigma_{i=1...M}\Sigma_{j=1...N}[\int E_i(\theta,\varphi)\cdot E_j(\theta,\varphi)d\Omega]/ [\int\|E_i(\theta,\varphi)\|\cdot\|E_j(\theta,\varphi)\|d\Omega] \quad (3),$$

where the outer and inner summations are indexed from i from 1 to M, and j from 1 to N, respectively, M and N are the number of active beams for terminals k and l, $E_i$ and $E_j$ represent the electric field pattern of the ith and jth beams in a spherical coordinate system, i.e. as a function of azimuth and elevation angles $\theta$, $\varphi$ and $d\Omega=\sin\theta\, d\theta\, d\varphi$ for the angular variable of integration $\Omega$. For more details, comparable beam coupling factor metrics are described for example in references such as "On Cross Coupling in Multiple-Beam Antennas," S. Stein, IRE Trans. On Antennas and Prog., vol. 10, Issue 5, pp. 548-558, September 1962, and "Phased Array Antenna Handbook," R. J. Mailloux, Artech House, Boston, London, 1994.

In some embodiments, two beams may be considered substantially uncoupled when they correspond to a summand in Equation (3) which makes a substantially zero contribution to the overall BCF, or at least a contribution which is below a predetermined threshold value, typically close to zero. In various embodiments, the orthogonal beams are substantially uncoupled from one another in a pairwise manner.

Following the performance of beam allocation for each terminal for example as described above, the total channel capacity of the Mu-MIMO may be expressed as:

$$C = \log_2 \det[I + (\rho/M)H_{mn}\cdot R_{SS}\cdot H_{mn}^H]\ (b/s/\text{Hz})$$
$$= \sum_i \log_2(1 + G_t^i \rho/M)\lambda_i),$$

where the summation index i is from 1 to r. Here, the beam-space channel matrix may be modified according to the terminal beam selection. There are two different types of entries in the modified channel matrix: active beam element and coupled beam element. When m is an active beam for user n:

$$H_{mn}=B_{mp} \cdot H_{pn}.$$

Otherwise:

$$H_{mn}=\Sigma_{i=1\ldots M}[\int E_i(\theta,\varphi) \cdot E_m(\theta,\varphi)d\Omega]/[\int \|E_i(\theta,\varphi)\| \cdot \|E_m(\theta,\varphi)\| d\Omega],$$

where M is the total number of active beams for terminal n. The covariance matrix $R_{SS}$ represents the signal power distribution in the beam-space for all terminals according to the beam selection scheme as described elsewhere herein. $\lambda_j$ is the ith eigenvalue and $G_t^i$ is the array gain of the $i^{th}$ eigenvector system matrix $H_{mn} \cdot R_{SS} \cdot H_{mn}{}^H$. In various embodiments, the array gain $G_t^i$ may be determined using the array excitation function for eigenvector i:

$$W_i(j)=\Sigma_t EV_m{}^n \cdot B_{mj}, j=1\ldots P \text{ ports},$$

where $W_i(j)$ is the excitation function for the $j^{th}$ antenna array radiating element for the $i^{th}$ eigen mode. In view of the above, it is noted that various embodiments of the present invention may provide a Mu-MIMO scheme which makes use of particular properties of orthogonal-beam-space, as identified herein, to realize a flexible higher-order sectorization of a geographic wireless service area such as but not necessarily limited to a cellular sector. This concept may be used in current standard three-sector cellular network as well as future wireless cellular or non-cellular networks.

Antenna Array Configuration

Aspects of the present invention comprise or utilize an antenna array configured to form a plurality of orthogonal radio beams having different radiation patterns. The plurality of radiation patterns may collectively span a predetermined geographic region served by the access point, for example with each the plurality of radiation patterns including a central portion of a main lobe, the central portions of the main lobes being mutually non-overlapping. In some embodiments, the central portions of the main lobes are spatially arranged in a grid pattern having adjacent rows which are diagonally offset, for example as previously illustrated in FIG. 1, which illustrates an example beam pattern corresponding to a 32-beam orthogonal-beam-space of an antenna array. The total number of beams may vary for example depending on the operating frequency and array size.

The beam pattern of FIG. 1 extends in the elevation and azimuthal directions. In some embodiments the pattern may be interpreted as a beam pattern as seen passing through a rectangular slice of space which is oriented substantially parallel to the antenna array. In some embodiments the pattern may be interpreted as a beam pattern as seen passing through an arcuate portion of a cylindrical, ellipsoidal or spherical slice of space which extends in the elevation direction substantially parallel to the antenna array and which is substantially equidistant from the antenna array. The antenna array may be disposed in a planar shape, cylindrical shape, or other appropriate shape. Assuming terminals reside in a flat geographic area around the antenna array, the illustrated beam pattern may project onto the geographic area so that different beams reach different portions of the geographic area. For example, beams in the lower part of the pattern may be angled more steeply downward so as to reach portions of the geographic area closer to the antenna, whereas beams in the upper part of the pattern may be angled less steeply downward so as to reach portions of the geographic area further from the antenna. Beams on the sides of the pattern may reach portions on the radial edges of the geographic area whereas beams in the center of the pattern may reach portions in the radial center of the geographic area.

In various embodiments, it is noted that the radio beams are distributed in a spatial pattern such that beams are allocated in space so as to radiate in different spatial directions, rather than being explicitly directed toward respective terminals. As such, two or more terminals may share beams if they are in similar locations or similar situations in which the sets of highest power beams for each of the two or more terminals include one or more beams which are common between the sets. Further, beamforming adjustments to track multiple terminals as they enter/exit and/or move through the network may be avoided or reduced. For each terminal, a subset of the given beams is selected based on beam power criteria, for example with a limited number of the highest-power beams being selected for use in communication with that terminal.

Figure 6A:
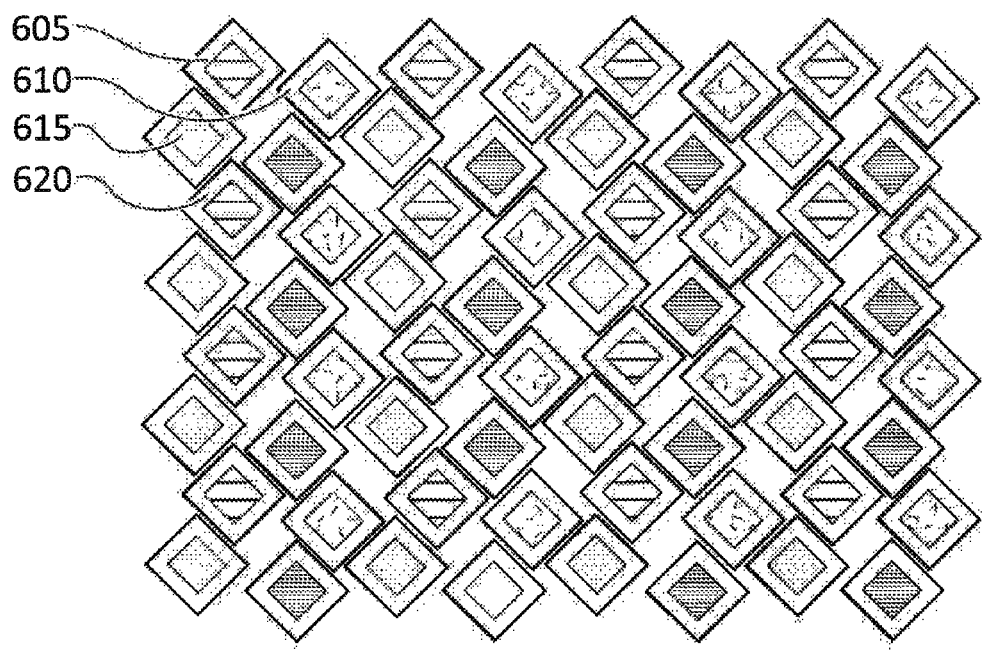
FIG. 6A illustrates an antenna array provided in accordance with embodiments of the present invention.

In order to effectively provide for the desired arrangement of beams and associated radiation patterns, the elements of the antenna array may be configured in a particular pattern. In some embodiments, the pattern may be an offset grid pattern. An offset grid pattern of antenna elements may facilitate implementation of a corresponding offset pattern of beams. In particular, in various embodiments, the antenna elements are spatially arranged in the array according to a pattern extending in azimuthal and elevation directions, wherein the pattern includes one or both of the following features: at least two antenna elements that are adjacent in the azimuthal direction are diagonally offset in the elevation direction; at least two antenna elements that are adjacent in the elevation direction are diagonally offset in the azimuthal direction, or a combination thereof. FIG. 6A illustrates an example of such an array configuration. The illustrated array configuration corresponds to a multi-column, multi-beam array architecture. The illustrated array comprises a plurality of active radiating elements that are spatially distributed in an offset rectangular array. The arrangement of elements is such that adjacent elements are offset in both the horizontal and vertical directions, but certain sets of non-adjacent elements may be aligned horizontally or vertically. In the example of FIG. 6A, four interleaved rectangular grid arrays of antenna elements are provided, although more or fewer numbers of interleaved arrays may be provided in other embodiments. Each grid of elements is offset both horizontally and vertically from each other grid of elements, and each grid of elements contains, internally, regular spaced elements which are aligned horizontally and vertically. For example, four elements 605, 610, 615, 620 are illustrated, each belonging to a different grid of elements. As illustrated, the four elements 605, 610, 615, 620 are mutually offset from each other both horizontally and vertically. Further, the pattern made by these four elements is repeated horizontally and vertically in a regular grid pattern to provide for the four interleaved arrays.

Figure 6B:
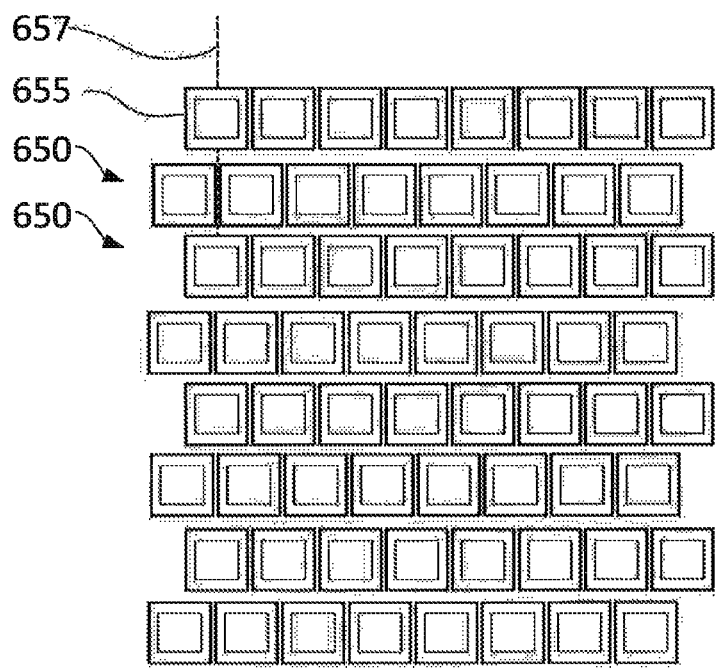
FIG. 6B illustrates an antenna array provided in accordance with other embodiments of the present invention.

FIG. 6B illustrates another example array configuration provided in accordance with some embodiments of the present invention. The illustrated array configuration corresponds to a two-dimensional array having a plurality of rows 650 of elements 655. Adjacent rows 650 are offset, for example such that the center line 657 elements 655 in one row extends to fall between elements 655 in an adjacent row. The elements 655 in each row 650 are substantially aligned along a direction which is perpendicular to the direction toward other rows. An alternative way of viewing the array of FIG. 6B is that it comprises two interleaved arrays, wherein each array comprises elements in a regular grid pattern, the two arrays are interleaved in that adjacent rows of one array are separated by a row of the other array, and the two arrays are diagonally offset from one another relative to the regular grid pattern.

The number of columns and rows in the offset array may be varied and need not necessarily be equal to one another. Alternatively, in some embodiments, passive radiating elements may be used to provide for a smaller size array. For example, in one embodiment, at least some of the active radiating elements in the array may be replaced with passive elements. The illustrated radiators of FIG. 6A are offset in azimuth and elevation directions, alternatingly, between rows and columns. This offset of the radiators may provide for improved low-beam-coupling beam patterns in both directions relative to a non-offset configuration. Alternatively, the array elements may be offset in only one direction as in FIG. 6B, or the array elements may be arranged in a non-offset, for example rectangular grid configuration, or another configuration.

In various embodiments, such as illustrated in FIGS. 6A and 6B, the antenna array includes multiple sets of antenna elements, each set of antenna elements being arranged in a respective regular grid pattern extending in two directions, such as the azimuthal and elevation directions, such that the regular grid patterns are interleaved, and each regular grid pattern is diagonally offset, with respect to these two directions, from each other regular grid pattern. Each regular grid pattern may correspond to a sub-array of elements, and interleaving may result in the elements of each sub-array being non-adjacent within the overall array. For example, as illustrated in FIG. 6B, there may be a first set of antenna elements and a second set of antenna elements, wherein the first set of antenna elements corresponds to the collection of odd numbered rows 650 of elements and the second set of antenna elements corresponds to the collection of even numbered rows 650 of elements. As illustrated in FIG. 6A, there may be first, second, third and fourth sets of antenna elements, wherein the first set includes the first element 605 and all elements horizontally and vertically aligned therewith, the second set includes the second element 610 and all elements horizontally and vertically aligned therewith, the third set includes the third element 615 and all elements horizontally and vertically aligned therewith, and the fourth set includes the fourth element 620 and all elements horizontally and vertically aligned therewith. In an alternative embodiment, one of the four sets is omitted.

In various embodiments, the radiating elements of the antenna array may be selected from a variety of types of broadband radiators such as a broadband patches or dipoles. The total number of columns and rows of radiating elements in the array may vary depending on antenna array requirements. For example, an array with more columns in the azimuth direction may be used to produce more beams with narrower azimuthal Half-Power Beamwidth (HPBW), which may be desirable in various embodiments of the present invention. More azimuthal beams may provide for more degrees of freedom for formation of flexible orthogonal-beam channels. In addition, in some embodiments, narrower beams may lead to lower transmit power requirement and may result in higher power efficiency.

In some embodiments, when the antenna elements are implemented as square or rectangular elements for example as illustrated in FIG. 6A, the edges of the square or rectangular antenna elements may be oriented at an angle, such as a 45° angle, relative to the elevation and/or azimuthal directions. This may facilitate a desired spacing of the antenna elements within the offset configuration, because corner overlap of adjacent antenna elements may be mitigated in this arrangement.

In various embodiments, the spatial arrangement of beams, for example including offset rows or columns of beams, may be provided so as to achieve one or both of improved beam orthogonality and low beam coupling factor (BCF). In various embodiments, the spatial arrangement of antenna elements in the array, for example including offset rows and/or columns of elements, may also be provided so as to improve beam coupling factor (BCF).

In some embodiments, beam selection and supporting measurements and calculations are carried out centrally, for example by a computer in the core network or associated with the access point or base station. In other embodiments, such tasks are performed at least in part in a distributed manner, for example by allocation of certain measurement and/or selection tasks to individual terminals. Communication of beam selection information and/or telemetry information may be performed for example using control channels of the wireless link.

Generally speaking, it is understood that the wireless communication system, including access point/base station, core network computing hardware, MIMO antenna control hardware, wireless terminals, and the like, will collectively include a set of elements such as microprocessors, memory elements for storing program instructions and other information, communication infrastructure, sensors and telemetry information acquisition elements, active and passive wireless environment and channel quality measurement means, and the like. As such, embodiments of the present invention may be implemented in various ways by operating these elements in concert with one another.

Various embodiments of the present invention are directed toward implementation so as to produce a set of substantially orthogonal beams with substantially low beam coupling factors. In general, multiple orthogonal beams may be produced using excitations with amplitudes and phases that are equivalently produced by an orthogonal beamformer such as a Fast-Fourier-Transform (FFT) algorithm or Butler matrix with uniform taper, or the like. However, the resultant beam patterns of such a beamformer may tend to have high side-lobes (−13 dB) due to uniform taper, which can result in poor BCF due to poor azimuth beam patterns. Use of amplitude taper can reduce the pattern sidelobes; however, this can result in severe loss of beam orthogonality. In practice, it is believed difficult to provide excitation functions which can produce a complete set of 2D beam patterns that meet both orthogonality and low beam-coupling factor criteria, simultaneously.

In view of the above, embodiments of the present invention provide for use of an array having an offset pattern of antenna elements, and a corresponding beam pattern having offset rows of beams, for example as illustrated in FIG. 6A and FIG. 1, respectively. In some embodiments, these array architectures may be operated to produce a set of substantially orthogonal beams in 2D space using excitations with uniform amplitude taper. In some embodiments, Beam Coupling Factor among these orthogonal beams may be reduced to a reasonably acceptable level using the offset beam arrangement, for example to a level below −17 dB.

Sample Implementations

Figure 7A:
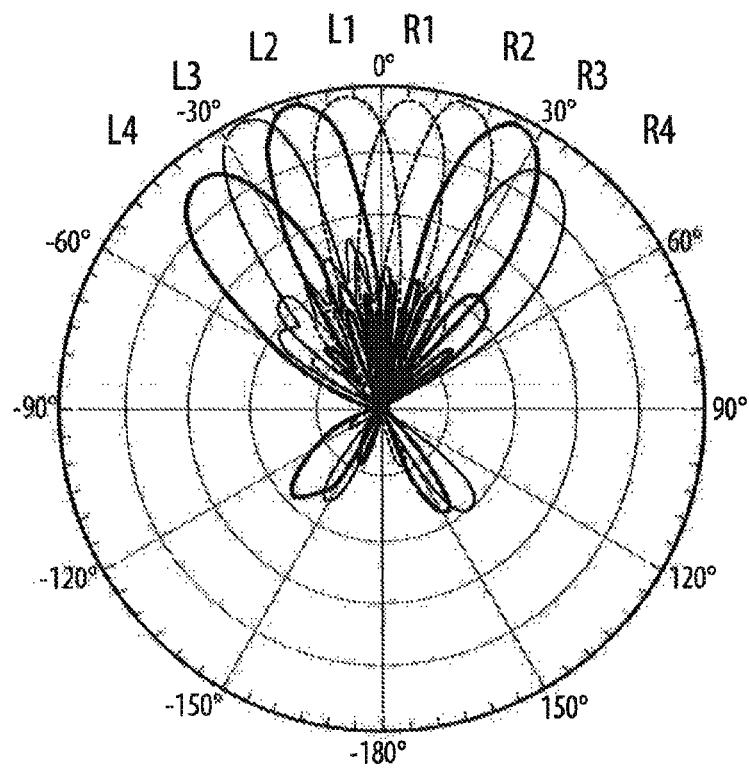
FIGS. 7A and 7B illustrate, in plan view, beam patterns of 8-beam and 40-beam orthogonal beam spaces, in accordance with embodiments of the present invention.
Figure 7B:
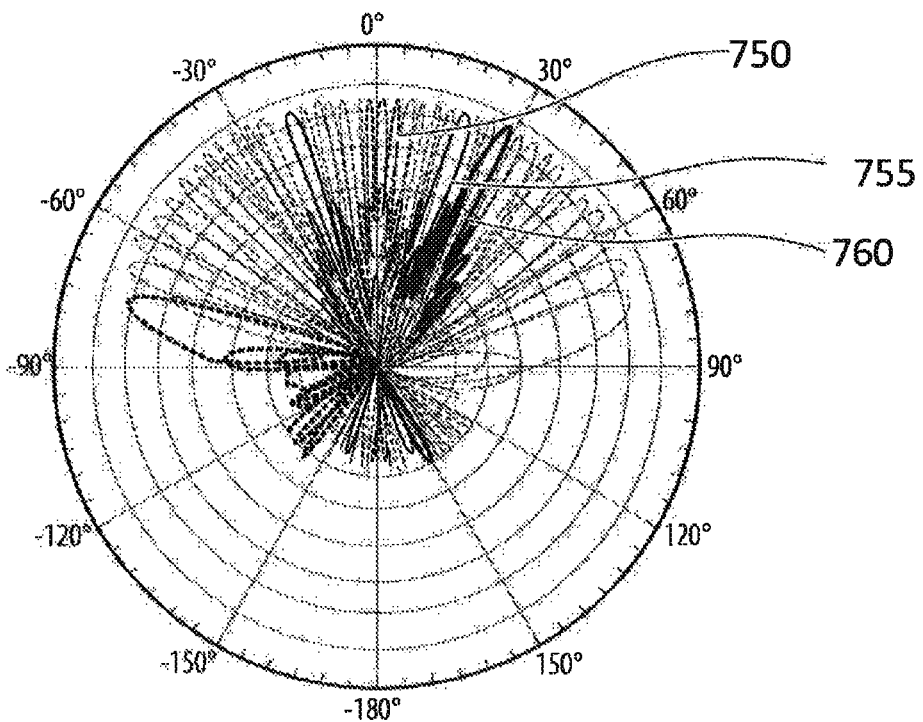

FIGS. 7A and 7B respectively illustrate possible orthogonal-beam channels of 8-beam and 40-beam orthogonal-beam-space arrays, in accordance with embodiments of the present invention. In the 8-beam case of FIG. 7A, a ±65 deg sector is dissolved into three orthogonal channels using 8 orthogonal beams: channel #1 consists of three beams L4, L2 and R3, channel #2 consists of two beams L3 and R4, and channel #3 consists of three beams L1, R1 and R2. In the 40-beam case of FIG. 7B, the orthogonal-beam space comprises of a total of 34 to 36 beams within a ±65 degree sector. In this case, there are also a total of three orthogonal-beam channels corresponding to three disjoint groupings 750, 755, 760 of beams. As an example, these three channels may be used for serving at least four terminals. As such, one channel may be shared by two terminals, for example by further sharing of orthogonal resources within the shared channel. As is evident in the 40-beam case of FIG. 7B, a larger number of beams results in more beams being available for additional orthogonal-beam spaces. In contrast, all beams are exhausted in the 8-beam case of FIG. 7A, which may be insufficient for large-scale implementations. In either case, typically, 2 to 3 orthogonal beams may be sufficient to form an orthogonal channel. Further, it is noted that the beams of a particular channel need not necessarily be neighboring beams, but rather can be selected from within the sector over a wide angular separation.

In various embodiments and as noted elsewhere herein, beam selection for a terminal is based at least in part on wireless signal propagation characteristics of that terminal, for example as represented at least in part by the MIMO channel matrices. More particularly, beam selection for each terminal may be achieved by examining power distribution over all beams. According to embodiments, a large concentration of the total power can be transmitted through only a few beams. As such, these limited numbers of beams with higher power ratios are selected for use in communication with each terminal based on a predetermined percentage of power criterion.

Figure 8A:
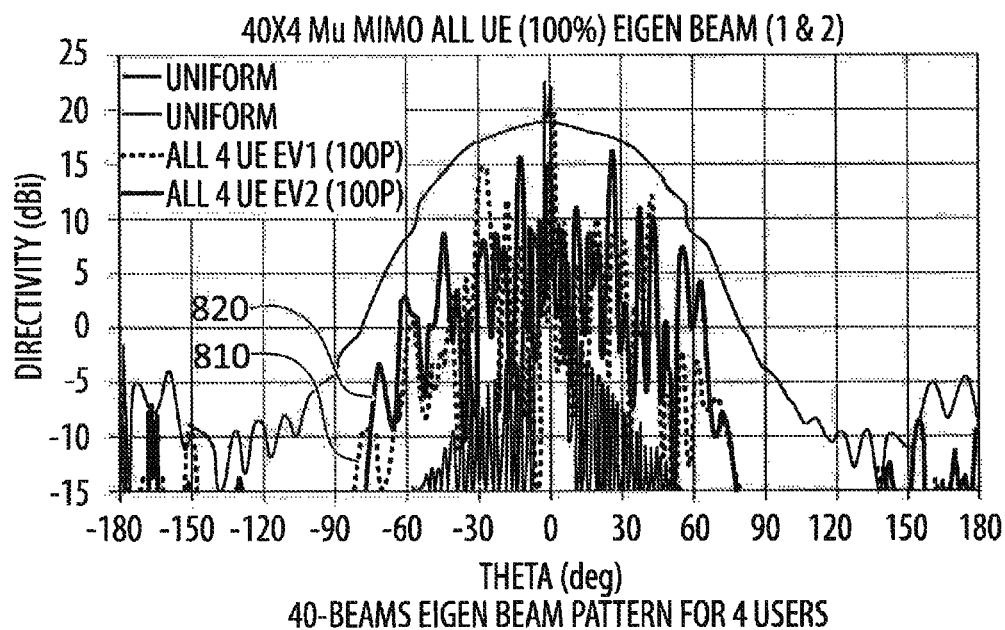
FIGS. 8A and 8B illustrate examples of eigen-beam patterns in accordance with embodiments of the present invention.
Figure 8B:
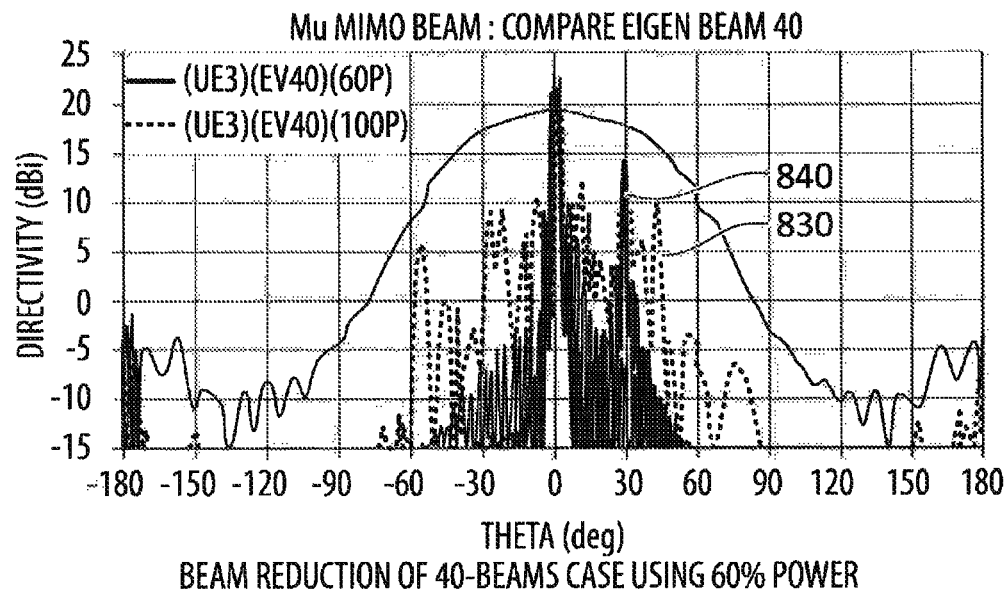

FIG. 8A illustrates an example of typical eigen-beam patterns for a 40-beam embodiment of the invention such as illustrated in FIG. 7B, and servicing 4 terminals. Directivity of the array is shown as a function of azimuth angle. Directive gain as a function of azimuth angle may follow a similar pattern. As shown, the spread angle (Theta) of the overall signal is relatively wide, for example almost encompassing an entire ±65 degree sector. The patterns 810 and 820 for two different eigen-beams are shown. FIG. 8B illustrates one of the eigen-beam patterns for a given terminal (UE3) only, for two cases: the first pattern 830 corresponds to a case in which the Pmin parameter in the beam selection operation is set to 100%; the second pattern 840 corresponds to a case in which Pmin in the beam selection operation is set to 60%. The 60% and 100% values correspond to the total transmit or receive power from the combination of beams in use. As shown by the two peaks of trace 840, the number of beams servicing UE3 may be reduced to two if the total power requirement is set at 60 of total power. As such, two beams may provide at least 60% of the power seen by UE3. Although FIG. 8B illustrates only one of the eigen-beam patterns, it is noted that proper beam selection of orthogonal channel for a particular terminal may require examination of power distribution over all beams in all eigen-beam patterns. For comparison, uniform radiation patterns are also shown in FIG. 8A and FIG. 8B, which correspond to a reference beam in which all radiating elements of the antenna array are excited using equal amplitude and phase in the azimuth direction.

In various embodiments, it is noted that the reduction in number of beams using the reduced power criteria does not necessarily represent a loss in power. This is due for example to the fact that the directivity of the channel is effectively increased as the number of beams is reduced in the manner described elsewhere herein.

Figure 9:
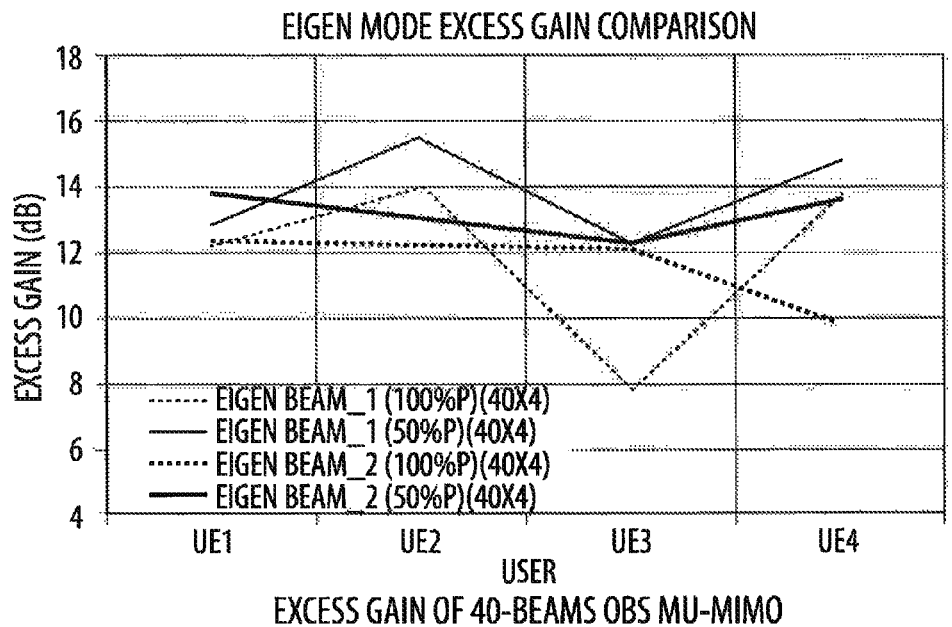
FIG. 9 illustrates performance metrics in accordance with an example 40-embodiment of the present invention.

As an example, FIG. 9 illustrates excess gains for a 40-beam embodiment of the present invention, such as illustrated in FIG. 7B, for orthogonal beam selection Mu-MIMO array, of an eigen-beam with 100% and 50% or 60% power ratio. Excess gain corresponds to the antenna gain compared to that of a single radiating element. As shown in FIG. 9, the excess gain may increase up to 4 dB by reducing the total beams from 100% to 50% or 60% power, that is by removing sufficient beams to reduce the power to 50% or 60% of total power. This is particularly true for downlink because all the transmit power will then be diverted to the reduced subset of beams. As a result, in various cases there may be little to no power lost. According to embodiments, a net gain in performance may be expected due to an increase in overall radiation pattern directivity of the eigen-beam. An eigen-beam may represent the radiation beam pattern of a particular spatial multiplexing mode, which uses a combination of orthogonal beams with different weight values. Each eigen-mode is orthogonal to other modes. Similar processes may be repeated to determine beams of orthogonal channels for other terminals.

Figure 10:
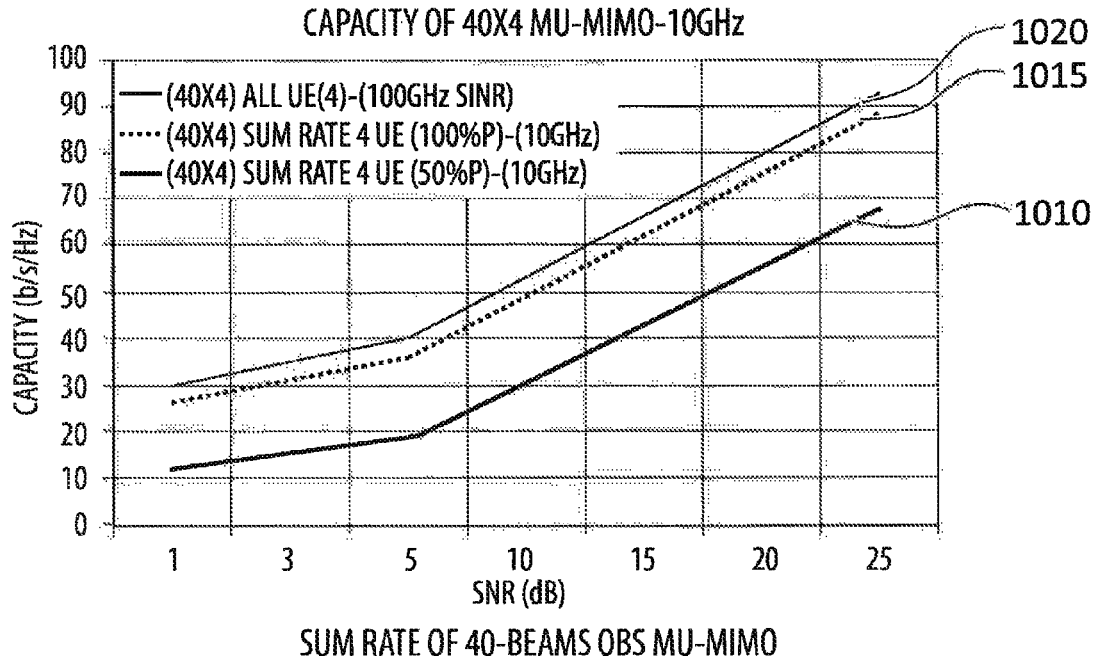
FIG. 10 also illustrates performance metrics in accordance with an example 40-embodiment of the present invention.

According to embodiments, orthogonalization of channels as described herein may potentially significantly reduce interference between terminals. Furthermore, beam efficiency may also be increased because of a reduction in the number of transmission beams for each terminal, and hence due to a corresponding increase in directivity for each terminal. FIG. 10 illustrates an increase in overall sum rate which can occur with certain embodiments of the present invention and which may correspond to the above example of a 40-beam case servicing four terminals. As illustrated, the lower trace 1010 represents a sum rate of all four terminals considering full effects of MUI, the middle trace 1015 represents a sum rate of all four orthogonalized terminals when using the Pmin=100% power criterion, and the upper trace 1020 represents a sum rate of all four orthogonalized terminals when using the Pmin=50% power criterion.

Various embodiments of the present invention may involve or incorporate additional details as described below.

Figure 11:
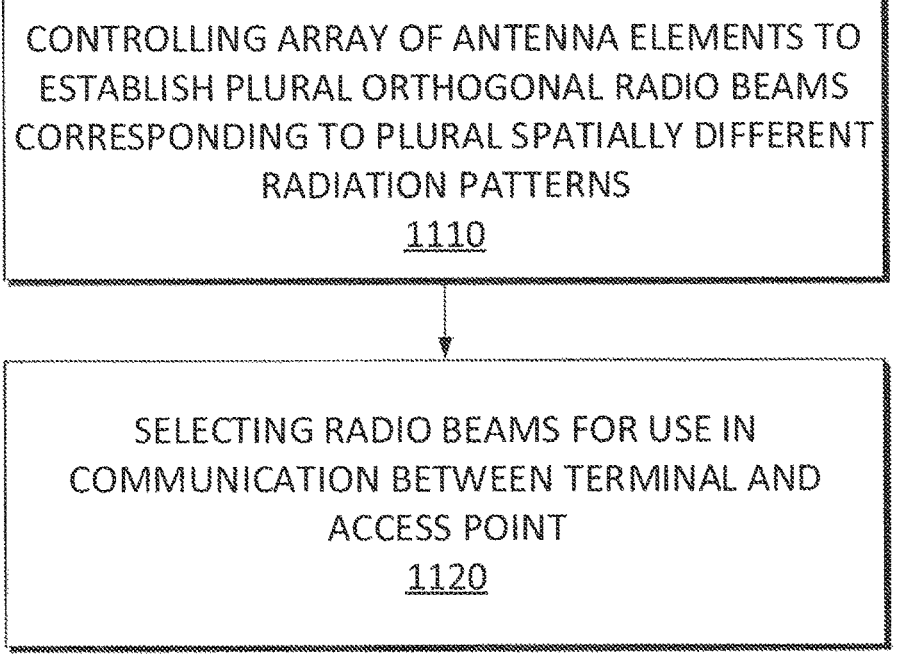
FIG. 11 illustrates a method provided in accordance with embodiments of the present invention.

Referring to FIG. 11, there is provided a method for radio communication between an access point and a set of terminals located in a predetermined geographic region served by the access point. The method includes controlling 1110 an array of antenna elements to establish a plurality of radio beams corresponding respectively to a plurality of radiation patterns, wherein the plurality of radiation patterns differ spatially from one another, and wherein the plurality of radio beams are mutually orthogonal. The method further includes, for each one of the set of terminals, selecting 1120 a subset of the plurality of radio beams for use in communication between said one of the set of terminals and the access point.

Embodiments of the present invention relate to a method for radio communication between an access point and a set of terminals located in a predetermined geographic region served by the access point, the method comprising: controlling an array of antenna elements, associated with the access point, to establish a plurality of mutually orthogonal radio beams, each of the established plurality of radio beams corresponding to a respective one of a plurality of radiation patterns, each of the plurality of radiation patterns differing spatially from other radiation patterns in the plurality; and selecting a subset of the plurality of radio beams for use in communication between one of the set of terminals and the access point. Communication may be unidirectional uplink or downlink communication, or bidirectional communication. Embodiments of the present invention relate to a wireless communication system and/or an access point configured in accordance with the method as described above.

Embodiments of the present invention relate to a method for radio communication between an access point and a set of terminals located in a predetermined geographic region served by the access point, the method comprising: controlling an array of antenna elements, associated with the access point, to establish a plurality of mutually orthogonal radio beams, each of the established plurality of radio beams corresponding to a respective one of a plurality of radiation patterns, each of the plurality of radiation patterns differing spatially from other radiation patterns in the plurality; and selecting a subset of the plurality of radio beams for use in signal reception from one of the set of terminals. Thus, the radio beams and corresponding radiation patterns may be radio beams and radiation patterns as seen by the access point, for example determined in accordance with receiver beamforming performed by the access point. The received radio beams and corresponding radiation patterns may behave similarly to the transmitted radio beams and radiation patterns discussed elsewhere herein through antenna reciprocity.

Embodiments of the present invention may additionally comprise using the selected subset of the plurality of radio beams, or selecting another subset of the plurality of radio beams, for use in signal transmission to said one of the set of terminals or to another one of the set of terminals. As such, the selected subset of the plurality of radio beams may be used in signal transmission to terminals, signal reception from terminals, or a combination thereof. Embodiments of the present invention relate to a wireless communication system and/or an access point configured in accordance with the method as described above.

In various embodiments, the use of large numbers of active antenna elements at the access point, for example in accordance with use of a massive MIMO array, may enhance the focusing of radio energy over a smaller solid angle. This may potentially lead to significant performance improvements with respect to radiated energy efficiency and overall spectral efficiency, for example because radio beams are focused to desired locations. Beam separation may also be used to facilitate spatial multiplexing.

In various embodiments, an antenna array such as a massive MIMO array as configured herein may be used to provide a power-efficient means of communication relative to current systems. Current base-station antenna arrays typically radiate in a relatively large angular space in the azimuth angles, for example providing a Half-Power Beamwidth (HPBW) between about ±65° and ±90°, in order to achieve the necessary signal coverage. This in turn requires a relatively high transmit power. Massive MIMO technology may offer improved power efficiency from both higher array gains and diversity effects. Further, embodiments of the present invention, with attendant massive MIMO array, may be configured to use a larger dimension in the azimuth direction and therefore significantly reduce the azimuth beamwidth. The dimension may relate to the number of antennas in the MIMO array, for example. As a result, the overall directivity of the MIMO antenna array may be higher than that of a current standard base-station antenna. This may further reduce the required transmit power significantly and improve the overall power efficiency.

In various embodiments, communication capacity may be increased if an access point such as a base station is able to communicate with more terminals by re-using the same frequency, time and/or code resources within a given geographic region such as but not limited to a cellular sector. Embodiments of the present invention involve subdivision of a sector into multiple orthogonal channels with potentially flexible channel sizes and which may match the signal propagation environment and user profiles. Such embodiments may comprise re-use of orthogonal code-frequency-time resources within different orthogonal channels of the geographic region. As a result, the radio network may be able to handle more terminals, thereby potentially achieving an increase of overall communication capacity.

As mentioned above, various embodiments of the present invention involve sub-dividing a geographic region, such as a cellular sector, into multiple orthogonal channels by using a large number of orthogonal beams. Because of channel orthogonality and the avoidance of relying on use of interference cancellation scheme, this approach may be deemed less likely to be subject to limitations of coherence time or user correlation relationship. This may provide an operational advantage over other types of MIMO schemes.

In various embodiments of the present invention, and in conjunction with an appropriate criterion for minimum power of detection, a terminal can typically be served effectively using less than all, and typically only a few, of the orthogonal beams. For example two to five beams may be used in some embodiments. This, in effect, results in a high-order sectorization of a geographic area being served, with flexible sizes and shapes of smaller orthogonal sectors. As a result, relatively large numbers of terminals may be served in different orthogonal beam space with relatively effective high-gain channels.

It should be readily apparent that embodiments of the present invention may be implemented for large-scale multi-user MIMO systems, for example servicing tens, hundreds, or more users per geographic region.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for radio communication between an access point and a set of terminals located in a predetermined geographic region served by the access point, the method comprising:
   controlling an array of antenna elements, associated with the access point, to establish a plurality of mutually orthogonal radio beams, each of the established plurality of radio beams corresponding to a respective one of a plurality of radiation patterns, each of the plurality of radiation patterns differing spatially from other radiation patterns in the plurality; and
   selecting a subset of the plurality of radio beams for use in transmitting a signal to one of the set of terminals;
   wherein mutual orthogonality of the plurality of radio beams corresponds to satisfaction, by each pair of the plurality of radio beams, of an orthogonality condition indicative that radiation patterns of a first beam and a second beam, corresponding to said pair of the plurality of radio beams, are spatially arranged so as to cause limited radio frequency interference between the first beam and the second beam; and wherein power coupling through internal feed circuits between a beam port for the first beam and a beam port for the second beam is below a predetermined threshold.

2. The method of claim 1, wherein each of the plurality of radio beams has a respective power level, said power level corresponding to an amount of power contribution, from said one of the plurality of radio beams and relative to a total amount of power from all of the plurality of radio beams, which passes between said one of the set of terminals and the access point, and wherein selecting the subset of the plurality of radio beams comprises selecting, for membership in the subset, radio beams having higher absolute or relative values of said power levels.

3. The method of claim 2, wherein selecting the subset of the plurality of radio beams comprises selecting, for membership in the subset, radio beams having higher power levels relative to one or both of: a predetermined threshold power level; and relative power levels of the plurality of radio beams.

4. The method of claim 2, wherein selecting the subset of the plurality of radio beams comprises selecting a minimal number of radio beams having a sum total of said power levels which exceeds a predetermined threshold power level.

5. The method of claim 4, wherein the predetermined threshold power level is a predetermined fraction of a sum total of the power levels of all of the plurality of radio beams.

6. The method of claim 2, wherein the power level is derived through spectral analysis of a matrix $H_k \cdot H_k^H$, wherein $H_k$ is a channel matrix for terminal k.

7. The method of claim 2, wherein the power level, for a given beam j of the plurality of radio beams and said one of the set of terminals k, corresponds to a value $P^k(j)$ satisfying:

$$P^k(j) = \Sigma_i \lambda_i^k \cdot \|EV^i(j)\|^2 \qquad (2),$$

wherein i is an index of summation over eigenvalues $\lambda_i^k$ of a system matrix $H_k \cdot H_k^H$, wherein $H_k$ is a MIMO channel matrix for terminal k, and $Ev^i(j)$ is a $j^{th}$ component of an ith eigenvector $EV^i$ of the matrix $H_k \cdot H_k^H$.

8. The method of claim 1, further comprising defining a plurality of channels, each of the plurality of channels corresponding to a disjoint set of the plurality of radio beams, and using each of the plurality of channels for communication with different members of the set of terminals.

9. The method of claim 8, wherein at least one of the plurality of channels is used for communication with two or more terminals, the method further comprising sharing said at least one of the plurality of channels between the two or more terminals using a multi-access scheme.

10. The method of claim 1, wherein mutual orthogonality of the plurality of radio beams corresponds to satisfaction, by each pair of the plurality of radio beams, of an orthogonality condition corresponding to:

$$\frac{\Sigma_i W_i^A \cdot W_i^{B*}}{\Sigma_i \|W_i^A \cdot W_i^{B*}\|} < \varepsilon,$$

wherein i is an index of summation over a number of the antenna elements, $W_i^A$ and $W_i^B$ are, respectively, complex-valued excitations of an ith antenna element for production of a beam A and a beam B corresponding to the pair of the plurality of radio beams, and ε is a predetermined threshold value which is selected to provide for a desired amount of orthogonality.

11. The method of claim 1, further comprising limiting beam overlap between subsets of the plurality of radio beams allocated to different members of the set of terminals.

12. The method of claim 1, wherein the array of antenna elements are spatially arranged according to a pattern extending in azimuthal and elevation directions, wherein the pattern includes one or both of the following:
   at least two antenna elements that are adjacent in the azimuthal direction are offset in the elevation direction; and
   at least two antenna elements that are adjacent in the elevation direction are offset in the azimuthal direction.

13. The method of claim 1, further comprising configuring the plurality of radiation patterns such that a Beam Coupling Factor (BCF) for all pairs of terminals k and/of the set of terminals is below a predetermined threshold, wherein the BCF between terminals k and/is given by:

$$BCF(k,l) = \Sigma_{i=1...M} \Sigma_{j=1...N} [E_i(\theta,\varphi) \cdot E_j(\theta,\varphi) d\Omega] / [\int \|E_i(\theta,\varphi)\| \cdot \|E_j(\theta,\varphi)\| d\Omega] \qquad (3),$$

wherein M and N are numbers of active beams for terminals k and l, $E_i$ and $E_j$ represent electric field patterns of $i^{th}$ and $j^{th}$ beams as a function of azimuth and elevation angles θ, φ and Ω is an angular variable of integration.

14. The method of claim 1, further comprising selecting the subset of the plurality of radio beams or another subset of the plurality of radio beams for use in receiving another signal from said one of the set of terminals or from another one of the set of terminals.

15. The method of claim 1, wherein mutual orthogonality of the plurality of radio beams corresponds to an orthogonality condition indicative that excitation vectors corresponding to the plurality of radio beams are substantially pairwise orthogonal, and wherein each of said excitation vectors is a vector, over radiating elements of the antenna arrays, of excitations for production of a corresponding one of the plurality of radio beams.

16. A wireless communication system for radio communication between an access point and a set of terminals located in a predetermined geographic region served by the access point, the wireless communication system comprising:
- an array of antenna elements associated with the access point;
- a beam controller configured to control the array of antenna elements to establish a plurality of mutually orthogonal radio beams, each of the plurality corresponding to one of a plurality of radiation patterns, each radiation pattern of the plurality differing spatially from other radiation patterns in the plurality;
- a beam selector configured to select a subset of the plurality of radio beams for use in transmitting a signal to one of the set of terminals;
- wherein mutual orthogonality of the plurality of radio beams corresponds to satisfaction, by each pair of the plurality of radio beams, of an orthogonality condition indicative that radiation patterns of a first beam and a second beam, corresponding to said pair of the plurality of radio beams, are spatially arranged so as to cause limited radio frequency interference between the first beam and the second beam; and wherein power coupling through internal feed circuits between a beam port for the first beam and a beam port for the second beam is below a predetermined threshold.

17. The system of claim 16, wherein each one of the plurality of radio beams has a respective power level, said power level corresponding to an amount of power contribution, from said one of the plurality of radio beams and relative to a total amount of power from all of the plurality of radio beams, which passes between said one of the set of terminals and the access point, and wherein the beam selector is configured to select the subset of the plurality of radio beams comprises selecting, for membership in the subset, radio beams having higher absolute or relative values of said power levels.

18. The system of claim 17, wherein selecting the subset of the plurality of radio beams comprises selecting, for membership in the subset, radio beams having higher power levels relative to one or both of: a predetermined threshold power level; and relative power levels of the plurality of radio beams.

19. The system of claim 17, wherein selecting the subset of the plurality of radio beams comprises selecting a minimal number of radio beams having a sum total of said power levels which exceeds a predetermined threshold power level.

20. The system of claim 17, wherein the power level is derived through spectral analysis, by the beam selector, of a matrix $H_k \cdot H_k^H$, wherein $H_k$ is a channel matrix for terminal k.

21. The system of claim 17, wherein the power level, for a given beam j of the plurality of radio beams and said one of the set of terminals k, corresponds to a value $P^k(j)$ satisfying:

$$P^k(j) = \Sigma_i \lambda_i^k \cdot \|EV^i(j)\|^2 \qquad (2),$$

wherein i is an index of summation over eigenvalues $\lambda_i^k$ of a system matrix $H_k \cdot H_k^H$, wherein $H_k$ is a MIMO channel matrix for terminal k, and $EV^i(j)$ is a $j^{th}$ component of an ith eigenvector $EV^i$ of the matrix $H_k \cdot H_k^H$.

22. The system of claim 16, wherein the beam selector is further configured to define a plurality of channels, each of the plurality of channels corresponding to a disjoint set of the plurality of radio beams, and using each of the plurality of channels for communication with different members of the set of terminals.

23. The system of claim 22, wherein at least one of the plurality of channels is used for communication with two or more terminals, the system further comprising a contention resolution module configured to direct sharing said at least one of the plurality of channels between the two or more terminals using a multi-access scheme.

24. The system of claim 16, wherein mutual orthogonality of the plurality of radio beams corresponds to satisfaction, by each pair of the plurality of radio beams, of an orthogonality condition corresponding to:

$$\frac{\sum_i W_i^A \cdot W_i^{B*}}{\sum_i \|W_i^A \cdot W_i^{B*}\|} < \varepsilon,$$

wherein i is an index of summation over a number of the antenna elements, $W_i^A$ and $W_i^B$ are, respectively, complex-valued excitations of an ith antenna element for production of a beam A and a beam B corresponding to the pair of the plurality of radio beams, and $\varepsilon$ is a predetermined threshold value which is selected to provide for a desired amount of orthogonality.

25. The system of claim 16, wherein the beam selector is configured to limit beam overlap between subsets of the plurality of radio beams allocated to different members of the set of terminals.

26. The system of claim 16, wherein the array of antenna elements comprises:
- a first set of antenna elements arranged in a first regular grid pattern extending in two directions;
- a second set of antenna elements arranged in a second regular grid extending in said two directions, wherein the second regular grid pattern is interleaved with the first regular grid pattern and is diagonally offset from the first regular grid pattern with respect to said two directions.

27. The system of claim 26, the array of antenna elements further comprising:
- a third set of antenna elements arranged in a third regular grid pattern extending in said two directions, wherein the third regular grid pattern is interleaved with the first regular grid pattern and the second regular grid pattern and is diagonally offset from both the first regular grid pattern and the second regular grid pattern with respect to said two directions.

28. The system of claim 27, the array of antenna elements further comprising:
- a fourth set of antenna elements arranged in a fourth regular grid pattern extending in said two directions, wherein the fourth regular grid pattern is interleaved with the first regular grid pattern, the second regular grid pattern and the third regular grid pattern, and is diagonally offset from each of the first regular grid pattern, the second regular grid pattern and the third regular grid pattern with respect to said two directions.

29. The system of claim 26, wherein the antenna elements have a rectangular shape, wherein edges of said rectangular shape are oriented at angle between the elevation direction and the azimuthal direction.

30. The system of claim 29, wherein each the plurality of radiation patterns includes a central portion of a main lobe, and wherein the central portions of the main lobes are spatially arranged in a grid pattern having adjacent rows which are diagonally offset.

31. The system of claim 16, wherein the beam controller is configured to provide the plurality of radiation patterns so as to collectively span one or both of: the predetermined geographic region; and an angular region of space adjacent to the array of antenna elements.

32. The system of claim 16, wherein the beam selector is further configured to select the subset of the plurality of radio beams or another subset of the plurality of radio beams for use in receiving another signal from said one of the set of terminals or from another one of the set of terminals.

33. The system of claim 16, wherein mutual orthogonality of the plurality of radio beams corresponds to an orthogonality condition indicative that excitation vectors corresponding to the plurality of radio beams are substantially pairwise orthogonal, and wherein each of said excitation vectors is a vector, over radiating elements of the antenna arrays, of excitations for production of a corresponding one of the plurality of radio beams.

34. An access point for serving, via radio communication, a set of terminals located in a predetermined geographic region, the access point comprising:
 an array of antenna elements;
 a beam controller configured to control the array of antenna elements to establish a plurality of mutually orthogonal radio beams, each of the established plurality of radio beams corresponding to one of a plurality of radiation patterns, each of the plurality of radiation patterns differing spatially from other radiation patterns in the plurality; and
 a beam selector configured to select a subset of the plurality of radio beams for use in transmitting a signal to one of the set of terminals;
 wherein mutual orthogonality of the plurality of radio beams corresponds to satisfaction, by each pair of the plurality of radio beams, of an orthogonality condition indicative that radiation patterns of a first beam and a second beam, corresponding to said pair of the plurality of radio beams, are spatially arranged so as to cause limited radio frequency interference between the first beam and the second beam; and wherein power coupling through internal feed circuits between a beam port for the first beam and a beam port for the second beam is below a predetermined threshold.

35. The access point of claim 34, wherein mutual orthogonality of the plurality of radio beams corresponds to an orthogonality condition indicative that excitation vectors corresponding to the plurality of radio beams are substantially pairwise orthogonal, and wherein each of said excitation vectors is a vector, over radiating elements of the antenna arrays, of excitations for production of a corresponding one of the plurality of radio beams.

* * * * *